United States Patent
Kazmi et al.

(10) Patent No.: US 12,416,704 B2
(45) Date of Patent: Sep. 16, 2025

(54) POSITIONING TIMING MEASUREMENT PROCEDURE UNDER TIMING OFFSET CHANGE

(71) Applicant: Telefonaktiebolaget LM Ericsson (publ), Stockholm (SE)

(72) Inventors: Muhammad Ali Kazmi, Sundbyberg (SE); Iana Siomina, Täby (SE); Stefan Fritze, Rosenheim (DE); Magnus Larsson, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 395 days.

(21) Appl. No.: 17/925,232

(22) PCT Filed: May 12, 2021

(86) PCT No.: PCT/EP2021/062771
§ 371 (c)(1),
(2) Date: Nov. 14, 2022

(87) PCT Pub. No.: WO2021/229029
PCT Pub. Date: Nov. 18, 2021

(65) Prior Publication Data
US 2023/0228837 A1    Jul. 20, 2023

Related U.S. Application Data

(60) Provisional application No. 63/025,583, filed on May 15, 2020.

(51) Int. Cl.
*G01S 5/14* (2006.01)
*G01S 5/02* (2010.01)

(52) U.S. Cl.
CPC ............... *G01S 5/14* (2013.01); *G01S 5/021* (2013.01)

(58) Field of Classification Search
CPC .................................. G01S 5/14; G01S 5/021
See application file for complete search history.

(56) References Cited

U.S. PATENT DOCUMENTS

2014/0086161 A1    3/2014   Cai et al.
2014/0086219 A1    3/2014   Suzuki et al.
(Continued)

FOREIGN PATENT DOCUMENTS

WO        2019097406 A1     5/2019

OTHER PUBLICATIONS

Japanese Office Action and English Summary dated Dec. 18, 2023 for Application No. 2022569244; consisting of 5 pages.
(Continued)

*Primary Examiner* — Mazda Sabouri
(74) *Attorney, Agent, or Firm* — Weisberg I.P. Law, P.A.

(57) ABSTRACT

A method and system are disclosed for a network node or wireless device (WD) to communicate with another WD or network node. The node or WD is configured to perform at least one timing measurement over a measurement period (T1) on signals transmitted between the node or WD and another node or WD and, during T1, determine if there is any change in a fixed time offset (FTO) used by the nodes for transmitting a reference signal. If there is a change in the FTO over T1, the network nodes or WDs are configured to perform an operational task and, if not, continue performing the timing measurement over T1. The operational tasks may include discarding the timing measurement, restarting the timing measurement, extending the measurement time, informing another node about a change in the FTO or informing another node about an action taken by the network node or WD.

19 Claims, 10 Drawing Sheets

(56) References Cited

U.S. PATENT DOCUMENTS

2015/0189610 A1* 7/2015 Siomina .................... H04L 5/14
                                                    370/280
2015/0341150 A1* 11/2015 Seo ......................... H04L 69/22
                                                    370/336
2016/0302098 A1* 10/2016 Gheorghiu .......... H04W 56/001
2018/0231648 A1* 8/2018 Zhang .................. H04W 64/00
2019/0394792 A1* 12/2019 Jeon .................. H04W 72/1215

OTHER PUBLICATIONS

International Search Report and Written Opinion dated Aug. 20, 2021 for International Application No. PCT/EP2021/062771 filed May 12, 2021, consisting of 13 pages.

* cited by examiner

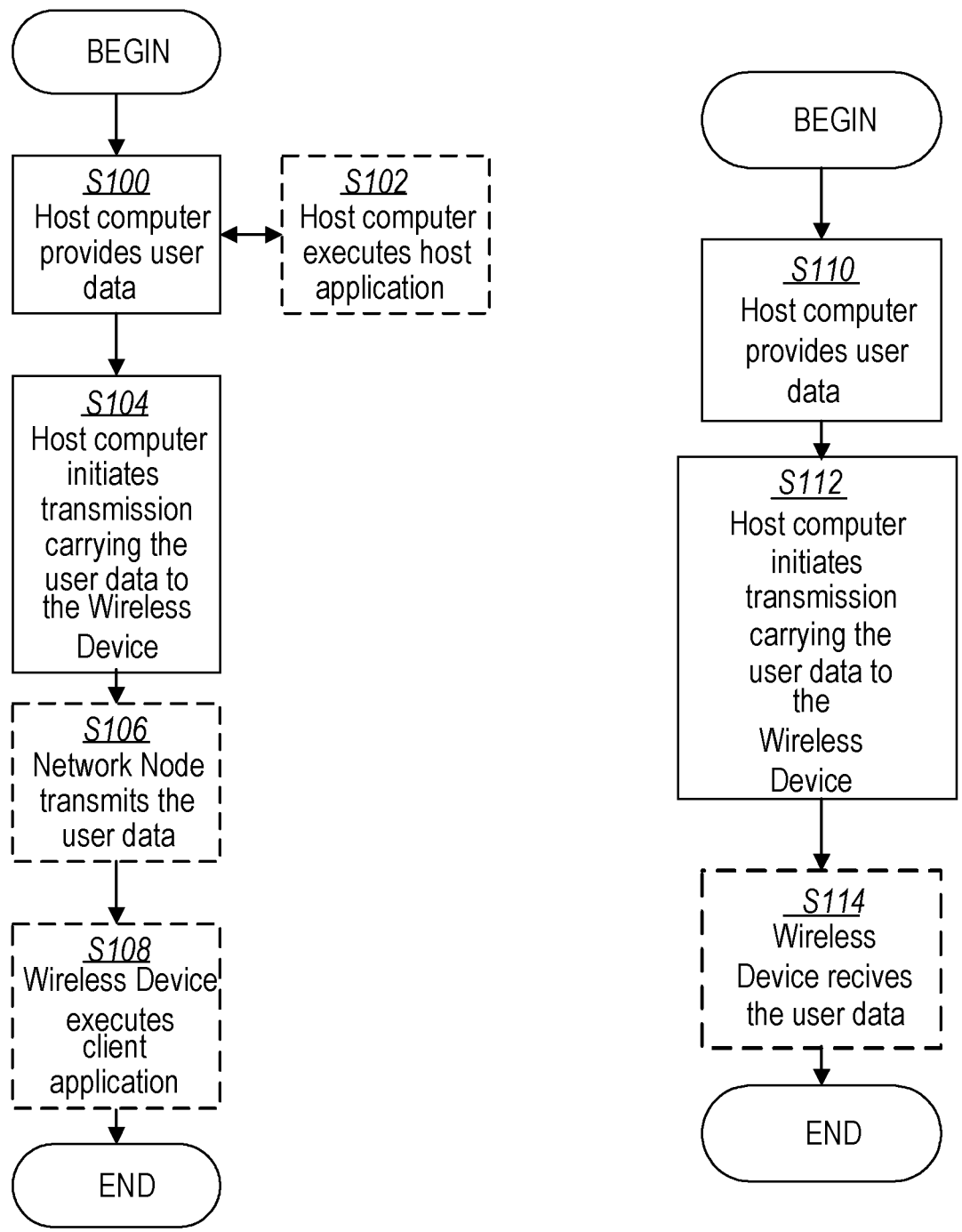

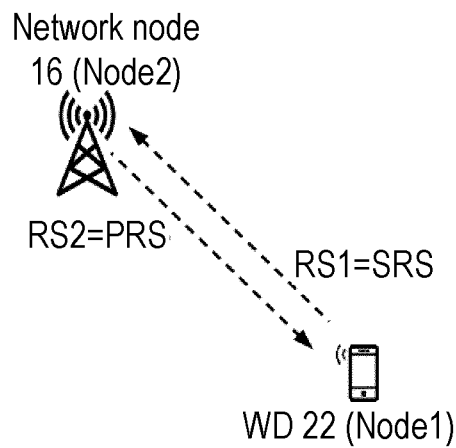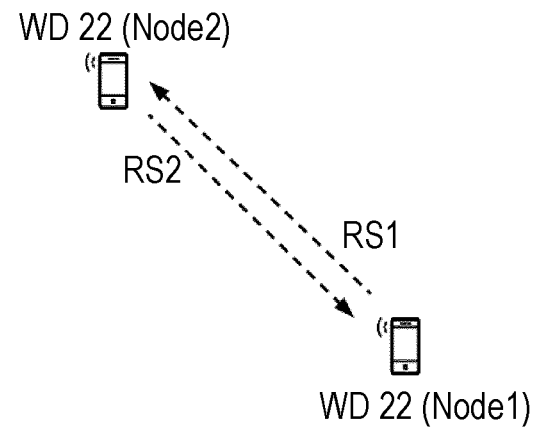
FIG. 13        FIG. 14
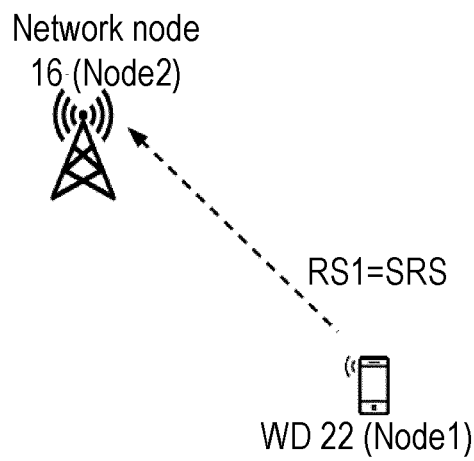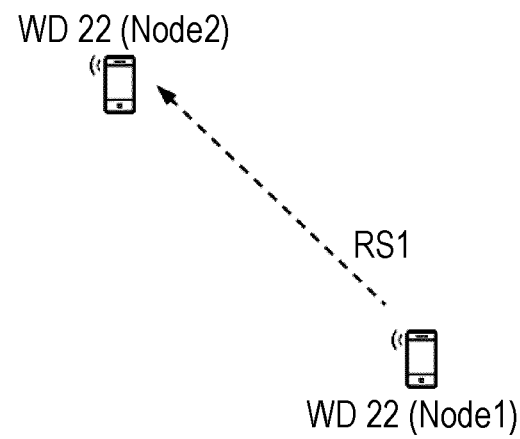
FIG. 15        FIG. 16

POSITIONING TIMING MEASUREMENT PROCEDURE UNDER TIMING OFFSET CHANGE

CROSS-REFERENCE TO RELATED APPLICATIONS

This application is a Submission Under 35 U.S.C. § 371 for U.S. National Stage Patent Application of International Application No.: PCT/EP2021/062771, filed May 12, 2021 entitled "POSITIONING TIMING MEASUREMENT PROCEDURE UNDER TIMING OFFSET CHANGE," which claims priority to U.S. Provisional Application No. 63/025,583, filed May 15, 2020, entitled "POSITIONING TIMING MEASUREMENT PROCEDURE UNDER TIMING OFFSET CHANGE," the entireties of both of which are incorporated herein by reference.

FIELD

The present disclosure relates to wireless communications, and in particular, to enhancing the reliability of timing measurements used for positioning in wireless communication systems.

INTRODUCTION

Positioning in NR

New radio (NR) (also known as "5G" or "Next Generation") architecture is being discussed in the 3rd Generation Partnership Project (3GPP). An example of the current concept is illustrated in FIG. 1, where gNB and ng-eNB (or evolved eNB) denote NR network nodes or base stations (BSs) (one NR BS may correspond to one or more transmission/reception points (TRPs)), and the lines between the network nodes illustrate the corresponding interfaces. FIG. 1 is an illustration of a NR architecture according to 3GPP Technical Standard (TS) 38.300).

Location Management Function (LMF) is the location node in NR. There are also interactions between the location node and the gNB via the NR Positioning Protocol (NRPP), a protocol (not illustrated in FIG. 1), and between the wireless device (WD), e.g., user equipment (UE), and the location server via NR Long-Term Evolution (LTE) positioning protocol (LPP). The interactions between the node and the WD are supported via the Radio Resource Control (RRC) protocol.

Note 1: The gNB and ng-eNB may not always both be present.

Note 2: When both the gNB and ng-eNB are present, the NG-C interface may only present for one of them.

Timing Measurements for Positioning

A timing measurement used for WD positioning can be unidirectional or it can be bidirectional. Unidirectional timing measurement is used by a first node (Node1) for measuring transmit timing of signals transmitted by Node1 or for measuring reception timing of signals received by Node1 from a second node (Node2). Bidirectional timing measurement may be used by Node1 for measuring relationships between the transmit timing of signals transmitted by Node1 and the reception timing of signals received at Node1 from Node2. An example of the relationships may be the difference between the transmission and the reception timings. In the timing measurements in one example, Node1 may measure the absolute reception timing of the signal and/or it may measure reception timing of the signal with respect to a reference time. Similarly in one example Node1 may measure the absolute transmit timing of the signal and/or it may measure transmit timing of the signal with reference to a reference time.

In NR, several timing measurements for positioning are specified. An example of bidirectional timing measurement is round trip time (RTT). Specific examples of bidirectional timing measurement are WD Rx-Tx time difference, network node Rx-Tx time difference, time advance (TA) etc.

The WD Rx-Tx time difference is defined as $T_{WD-RX} - T_{WD-TX}$

Where:
$T_{WD-RX}$ is the WD received timing of downlink subframe #i from a positioning node, defined by the first detected path in time. It is measured on Positioning Reference Signals (PRS) received from the network node.

$T_{WD-TX}$ is the WD transmit timing of uplink subframe #j that is closest in time to the subframe #i received from the positioning node. It is measured on Sounding Reference Signals (SRS) transmitted by the WD.

The network node Rx-Tx time difference is defined as $T_{Node-RX} - T_{Node-TX}$ Where:
$T_{Node-RX}$ is the positioning node received timing of uplink subframe #i containing SRS associated with the WD, defined by the first detected path in time. It is measured on SRS signals received from the WD.

$T_{Node-TX}$ is the positioning node transmit timing of downlink subframe #j that is closest in time to the subframe #i received from the WD. It is measured on PRS signals transmitted by the network node.

Other examples of bidirectional measurements are network node measurements such as Timing Advance Type 1 and Timing Advance Type 2, as were specified in LTE (GPP TS 36.214).

An example of unidirectional timing measurement is UL Relative Time of Arrival (UL RTOA). It is defined as the beginning of subframe i containing SRS received in positioning node j, relative to the configurable reference time. For example, node1 (e.g. base station etc.) measures the reception time of signals transmitted by the WD with respect to a reference time.

Reference Signals for NR RTT Positioning Measurements

Positioning Reference Signals

Positioning reference signal (PRS) may be periodically transmitted on a positioning frequency layer in PRS resources in the downlink (DL) by the network node. The information about the PRS resources is signaled to the WD by the positioning node via higher layers but may also be provided by base station e.g. via broadcast. Each positioning frequency layer comprises PRS resource sets, where each PRS resource set comprises one or more PRS resources. All the DL PRS resources within one PRS resource set are configured with the same periodicity. The PRS resource periodicity ($T_{per}^{PRS}$) may include:

$T_{per}^{PRS} \in 2^\mu \cdot \{4, 8, 16, 32, 64, 5, 10, 20, 40, 80, 160, 320, 640, 1280, 2560, 5120, 10240, 20480\}$ slots, where $\mu=0, 1, 2, 3$ for PRS SCS of 15, 30, 60 and 120 kHz, respectively. $T_{per}^{PRS}=2^\mu \cdot 20480$ is not supported for $\mu=0$.

Each PRS resource can also be repeated within one PRS resource set and takes values $T_{per}^{PRS} \in \{1, 2, 4, 6, 8, 16, 32\}$.

PRS are transmitted in consecutive number of symbols ($L_{PRS}$) within a slot: $LPRS \in \{2, 4, 6, 12\}$. The following DL PRS resource element (RE) patterns, with comb size $K_{PRS}$ equal to number of symbols LPRS may be supported:

Comb-2: Symbols {0, 1} have relative RE offsets {0, 1}
Comb-4: Symbols {0, 1, 2, 3} have relative RE offsets {0, 2, 1, 3}

Comb-6: Symbols {0, 1, 2, 3, 4, 5} have relative RE offsets {0, 3, 1, 4, 2, 5}

Comb-12: Symbols {0, 1, 2, 3, 4, 5, 6, 7, 8, 9, 10, 11} have relative RE offsets {0, 6, 3, 9, 1, 7, 4, 10, 2, 8, 5, 11}

Maximum PRS bandwidth (BW) is 272 physical resource blocks (PRBs). Minimum PRS BW is 24 PRBs. The configured PRS BW is always a multiple of 4.

Sounding Reference Signals

For positioning measurement, the WD can be configured (typically by the serving base station) with SRS resource for SRS transmission in $N_S \in \{1, 2, 4, 8, 12\}$ number of adjacent symbols anywhere within the slot. The periodic SRS resource can be configured with a periodicity (TSRS): $T_{SRS} \in \{1, 2, 4, 5, 8, 10, 16, 20, 32, 40, 64, 80, 160, 320, 640, 1280, 2560\}$ slots WD Transmit Timing Adjustment Procedure In NR, the WD starts uplink transmission in radio frame number i $(N_{TA}+N_{TA\ offset}) \times T_c$ seconds before the start of the corresponding downlink radio frame i at the WD, where 1 Tc≈0.51 ns (basic time unit in NR, for example as specified in GPP TS 38.211 v16.1.0). An example of this is shown in FIG. 2. The $N_{TA}$ depends on the timing advance (TA) command sent to the WD by the base station. The TA adjustment step size depends on the subcarrier spacing (SCS) of the uplink signal. $N_{TA}$ is therefore a variable time offset which relates uplink (UL) and DL frame timings. The WD is also configured with $N_{TA}$ offset which depends on the duplex mode of the cell in which the uplink transmission takes place and the frequency range (FR) as shown in table 1, e.g., $N_{TA\ offset}$=0, 25600 Tc (13 μs) and 39936 Tc (20 μs) in frequency range #1 (FR1) and 13792 Tc (7 μs) in frequency range #2 (FR2). $N_{TA\ offset}$ is therefore a fixed time offset (FTO) relating the UL and DL frame timings.

FIG. 2 is an illustration of the uplink-downlink timing relationship in NR (1 $T_s$=64 $T_c$)

TABLE 1

The Value of $N_{TA\ offset}$

| Frequency range and band of cell used for uplink transmission | $N_{TA\ offset}$ (Unit: Tc) |
| --- | --- |
| FR1 frequency division duplex (FDD) band without LTE-NR coexistence case or FR1 time division duplex (TDD) band without LTE-NR coexistence case | 25600 (Note 1) |
| FR1 FDD band with LTE-NR coexistence case | 0 (Note 1) |
| FR1 TDD band with LTE-NR coexistence case | 39936 (Note 1) |
| FR2 | 13792 |

In NR there are currently 3 possible $N_{TA\ offset}$ values for FR1 and hitherto one $N_{TA\ offset}$ value for FR2. At least in FR1 the WD can be configured by the network node with one of the three possible NTA offset values.

SUMMARY

In future it is likely that multiple $N_{TA\ offset}$ values are also defined for FR2 requiring the network node to configure one of the possible values. It has been appreciated that the $N_{TA\ offset}$ introduces a bias in the timing measurement which involves measurement on at least the signal transmitted by the WD. The bias will induce substantial error in the positioning accuracy. The bias can be removed by the network node (e.g. positioning node, base station, etc.) if the same $N_{TA\ offset}$ is consistently used during the measurement period. However, any change in the $N_{TA\ offset}$ during the measurement period may lead to unpredictable bias which in turn may lead to failing the positioning.

Some embodiments advantageously provide methods, systems, and apparatuses for performing a timing measurement when there is a change in a fixed time offset (FTO) during the measurement period. According to some embodiments, a first node (Node1) performs a timing measurement on signals transmitted between Node1 and a second node (Node2), determines if there is any change in a fixed time offset (FTO) (e.g. $N_{TA\ offset}$) during the timing measurement period (T1), and performs one or more operational tasks based on the determination. Examples of operational tasks comprise:

If the FTO changes significantly, e.g., at least N (N≥1) times and/or by at least Δ time units, during T1 then performing one or more of:

Discarding the measurement,

Restarting the measurement,

Extend the measurement time by certain margin and performing the measurement over the extended measurement period e.g. extending T1 to T1' (T1'>T1) where T1'=f(T1, N), Informing another node (e.g. Node2, a third node (Node3), etc.) about the change in the FTO during T1, In a further example, the information may be also indicative of the type of the change and/or the amount of the change, Sending to another node (e.g., any one or more of Node2, Node3, etc.) an error message or error indication for the timing measurement due to the determined change (e.g., via RRC, LPP, NRPPa, or via physical layer signaling such as a control channel, etc.).

Else if the FTO does not change significantly during T1 then continue performing the measurement over T1.

According to some embodiments, Node2 performs a timing measurement on signals transmitted between Node1 and a second node (Node2), determines if there is any change in a fixed time offset (FTO) (e.g. $N_{TA\ offset}$) during the timing measurement period (T2), and performs one or more operational tasks based on the determination. Examples of operational tasks comprise:

If the FTO changes significantly, e.g., at least N (N≥1) times and/or by at least Δ time units, during T2 then performing one or more of:

Discarding the measurement,

Restarting the measurement,

Extend the measurement time by certain margin and performing the measurement over the extended measurement period e.g. extending T2 to T2' where T2'=f(T2, N) or Informing another node (e.g. Node1, a third node (Node3)) about change in the FTO during T2, In a further example, the information may be also indicative of the type of the change and/or the amount of the change (the information can be used to compensate the measurement for the change), Sending to another node (e.g., any one or more of Node1, Node3, etc.) an error message or error indication for the timing measurement due to the determined change (e.g., via RRC, LPP, NRPPa, or via physical layer signaling such as a control channel, etc.), Reconfiguring the measurement, Triggering or sending a trigger for a new measurement instead of the measurement during which the change was determined, Configuring and/or triggering one or more signals to be used for the restarted or the new measurement.

Else if the FTO does not change significantly during T2 then continue performing the measurement over T2.

Node3 receiving a message or indication (e.g., from Node1 or Node2) about a determined significant change associated with a measurement may perform one or more operational tasks:

Discarding the measurement,

Restarting the measurement,

Extend the measurement time or the time until the measurement report is expected to be received by certain margin, Reconfiguring the measurement, Triggering or sending a trigger for a new measurement instead of the measurement during which the change was determined, Compensating the received measurement by the amount of the determined change if the measurement is to be used e.g. for positioning.

Node1 and Node2 differ in that:

Node1 is configured to transmit a first reference signal (RS1) to a second node (Node2).

Node2 is configured to transmit a second reference signal (RS1) to a second node (Node1).

Node1 transmits RS1 at least FTO before the reception of RS1 from Node2.

In some embodiments Node1 and Node2 are a WD and network node (e.g. serving or non-serving BS, TRP, gNB, eNB, LMU etc.) respectively, in which case the timing measurement may be performed by the WD and/or by the network node. In this case, example of RS1 is SRS or Random Access Channel (RACH) or another UL signal, and example of RS2 is PRS or another DL signal.

In another example both Node1 and Node2 are WDs (WD1 and WD2 respectively), in which case the timing measurement is performed by WD1 and/or by WD2 on signals operating between WD1 and WD2. In this case in one example RS1 and RS2 are SRS1 and SRS2 respectively, other examples are sidelink reference signals or channels.

In an embodiment, Node3 is a positioning node or another network node.

The arrangements provided herein enhance the performance of positioning as compared with other solutions based on the timing measurement even if the $N_{TA\ offset}$ changes during the measurement time. The arrangements provided herein also enhance the reliability of the timing measurement used for positioning.

The behavior of the measuring node (e.g. WD, gNB, LMU etc.) is well defined and is consistent even when the $N_{TA\ offset}$ changes during the measurement time.

According to one aspect of the disclosure, a first node configured to communicate with a second node is provided. The first node includes processing circuitry configured to: perform at least a first timing measurement over a first measurement period on signals communicated between the first node and second node; determine that a fixed time offset, FTO, has changed during the first timing measurement period; and perform at least one operational task based on the determination that the FTO has changed.

According to one or more embodiments, the FTO is determined to have changed from a previously configured FTO that is set before the first measurement period. According to one or more embodiments, the at least one operational task includes at least one of: discarding at least the first timing measurement; restarting at least the first timing measurement; and extending the first measurement period. According to one or more embodiments, the at least one operational task includes discarding the first timing measurement. According to one or more embodiments, the at least one operational task includes one of: informing a third node about the change in the FTO; and informing the third node about the at least one operational task.

According to one or more embodiments, the processing circuitry is further configured to, after performing the at least one operational task, receive an indication of a modified FTO to implement. According to one or more embodiments, the first node is a wireless device and the second node is a base station. According to one or more embodiments, the first node is a wireless device and the second node is a wireless device. According to one or more embodiments, the signals communicated between the first node and second node include: at least a first signal transmitted by the first node; and at least a second signal received from the second node.

According to one or more embodiments, the first node is configured to transmit the first signal at a time instance T1 occurring at least the FTO before the second signal is received from the second node. According to one or more embodiments, the first and second signals are reference signals. According to one or more embodiments, the processing circuitry is further configured to: perform at least a second timing measurement over a second measurement period on signals communicated between the first and second node; determine that the FTO has not changed based on at least the second timing measurement; and continue performing at least the second timing measurement over second measurement period. According to one or more embodiments, the first node is configured to communicate with the second node according to New Radio, NR, Radio Access Technology, RAT, and the FTO corresponds to parameter $N_{TA\ offset}$.

According to another aspect of the disclosure, a positioning node in communication with a first node and second node is provided. The first and second nodes is configured to communicate signals with each other. The positioning node includes processing circuitry configured to configure the first node to perform at least a first timing measurement over a first measurement period on signals communicated between the first node and second node, receive an indication that a fixed time offset, FTO, has changed during the first timing measurement period, and perform at least one operational task based on the indication that the FTO has changed.

According to one or more embodiments, the processing circuitry is further configured to: receive an indication from the first node that at least one operational measurement task has been performed by the first node. According to one or more embodiments, the FTO changed from a previously configured FTO that is set before the first measurement period. According to one or more embodiments, the at least one operational task includes at least one of: discarding at least the first timing measurement; restarting at least the first timing measurement; extending the first measurement period; reconfiguring the first measurement; configuring the first node with a new measurement; compensating the received first timing measurement to account for the FTO change; and indicate to the first node to implement a modified FTO.

According to one or more embodiments, the at least operational task includes discarding the first timing measurement. According to one or more embodiments, the first node is wireless device and the second node is a base station. According to one or more embodiments, the first node is a wireless device and the second node is a wireless device.

According to one or more embodiments, the signals communicated between the first node and second node include: at least a first signal transmitted by the first node; and at least a second signal received at the first node from the second node. According to one or more embodiments, the first node is configured to transmit the first signal at a time instance T1 occurring at least the FTO before the second signal is received from the second node. According to one or more embodiments, the first and second signals are reference signals. According to one or more embodiments, the positioning node is configured to communicate with the first node and the second node according to New Radio, NR, Radio Access Technology, RAT, and the FTO corresponds to parameter $N_{TA\ offset}$.

According to another aspect of the disclosure, a method implemented by first node that is configured to communicate with a second node is provided. At least a first timing measurement is performed over a first measurement period on signals communicated between the first node and second node. A determination is made that a fixed time offset, FTO, has changed during the first timing measurement period. At least one operational task is performed based on the determination that the FTO has changed.

According to one or more embodiments, the FTO is determined to have changed from a previously configured FTO that is set before the first measurement period. According to one or more embodiments, the at least one operational task includes at least one of: discarding at least the first timing measurement, restarting at least the first timing measurement, and extending the first measurement period. According to one or more embodiments, the at least one operational task includes discarding the first timing measurement. According to one or more embodiments, the at least one operational task includes one of: informing a third node about the change in the FTO; and informing the third node about the at least one operational task.

According to one or more embodiments, after performing the at least one operational task, an indication of a modified FTO to implement is received. According to one or more embodiments, the first node is a wireless device and the second node is a base station. According to one or more embodiments, the first node is a wireless device and the second node is a wireless device. According to one or more embodiments, the signals communicated between the first node and second node include: at least a first signal transmitted by the first node; and at least a second signal received from the second node.

According to one or more embodiments, the first node is configured to transmit the first signal at a time instance T1 occurring at least the FTO before the second signal is received from the second node. According to one or more embodiments, the first and second signals are reference signals. According to one or more embodiments, at least a second timing measurement is performed over a second measurement period on signals communicated between the first and second node, a determination is made that the FTO has not changed based on at least the second timing measurement, and at least the second timing measurement is continued to be performed over second measurement period. According to one or more embodiments, the first node is configured to communicate with the second node according to New Radio, NR, Radio Access Technology, RAT, and the FTO corresponds to parameter $N_{TA\ offset}$.

According to another aspect of the disclosure, a method implemented by a positioning node that is in communication with a first node and second node is provided. The first and second nodes is configured to communicate signals with each other. The first node is configured to perform at least a first timing measurement over a first measurement period on signals communicated between the first node and second node. An indication that a fixed time offset, FTO, has changed during the first timing measurement period is received. At least one operational task is performed based on the indication that the FTO has changed.

According to one or more embodiments, an indication from the first node that at least one operational measurement task has been performed by the first node is received. According to one or more embodiments, the FTO changed from a previously configured FTO that is set before the first measurement period. According to one or more embodiments, the at least one operational task includes at least one of: discarding at least the first timing measurement, restarting at least the first timing measurement, extending the first measurement period, reconfiguring the first measurement, configuring the first node with a new measurement, compensating the received first timing measurement to account for the FTO change, and indicate to the first node to implement a modified FTO.

According to one or more embodiments, the at least operational task includes discarding the first timing measurement. According to one or more embodiments, the first node is wireless device and the second node is a base station. According to one or more embodiments, the first node is a wireless device and the second node is a wireless device. According to one or more embodiments, the signals communicated between the first node and second node include: at least a first signal transmitted by the first node, and at least a second signal received at the first node from the second node.

According to one or more embodiments, the first node is configured to transmit the first signal at a time instance T1 occurring at least the FTO before the second signal is received from the second node. According to one or more embodiments, the first and second signals are reference signals. According to one or more embodiments, the positioning node is configured to communicate with the first node and the second node according to New Radio, NR, Radio Access Technology, RAT, and the FTO corresponds to parameter $N_{TA\ offset}$.

According to another aspect of the disclosure, a computer readable medium including instructions is provided. When the instructions are executed by a processor, the processor is caused to: perform at least a first timing measurement over a first measurement period on signals communicated between a first node and a second node, determine that a fixed time offset, FTO, has changed during the first timing measurement period, and perform at least one operational task based on the determination that the FTO has changed.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 5 is a flowchart illustrating exemplary methods implemented in a communication system including a host computer, a network node and a wireless device for executing a client application at a wireless device according to some embodiments of the present disclosure;

FIG. 6 is a flowchart illustrating exemplary methods implemented in a communication system including a host computer, a network node and a wireless device for receiving user data at a wireless device according to some embodiments of the present disclosure;

FIG. 13 is an example of network nodes performing bi-directional timing measurements according to some embodiments of the present disclosure;

FIG. 14 is another example of network nodes performing bi-directional timing measurements according to some embodiments of the present disclosure FIG. 15 is an example of a network node performing unidirectional timing measurements according to some embodiments of the present disclosure;

FIG. 16 is another example of a network node performing unidirectional timing measurements according to some embodiments of the present disclosure;

DETAILED DESCRIPTION

Figure 1:
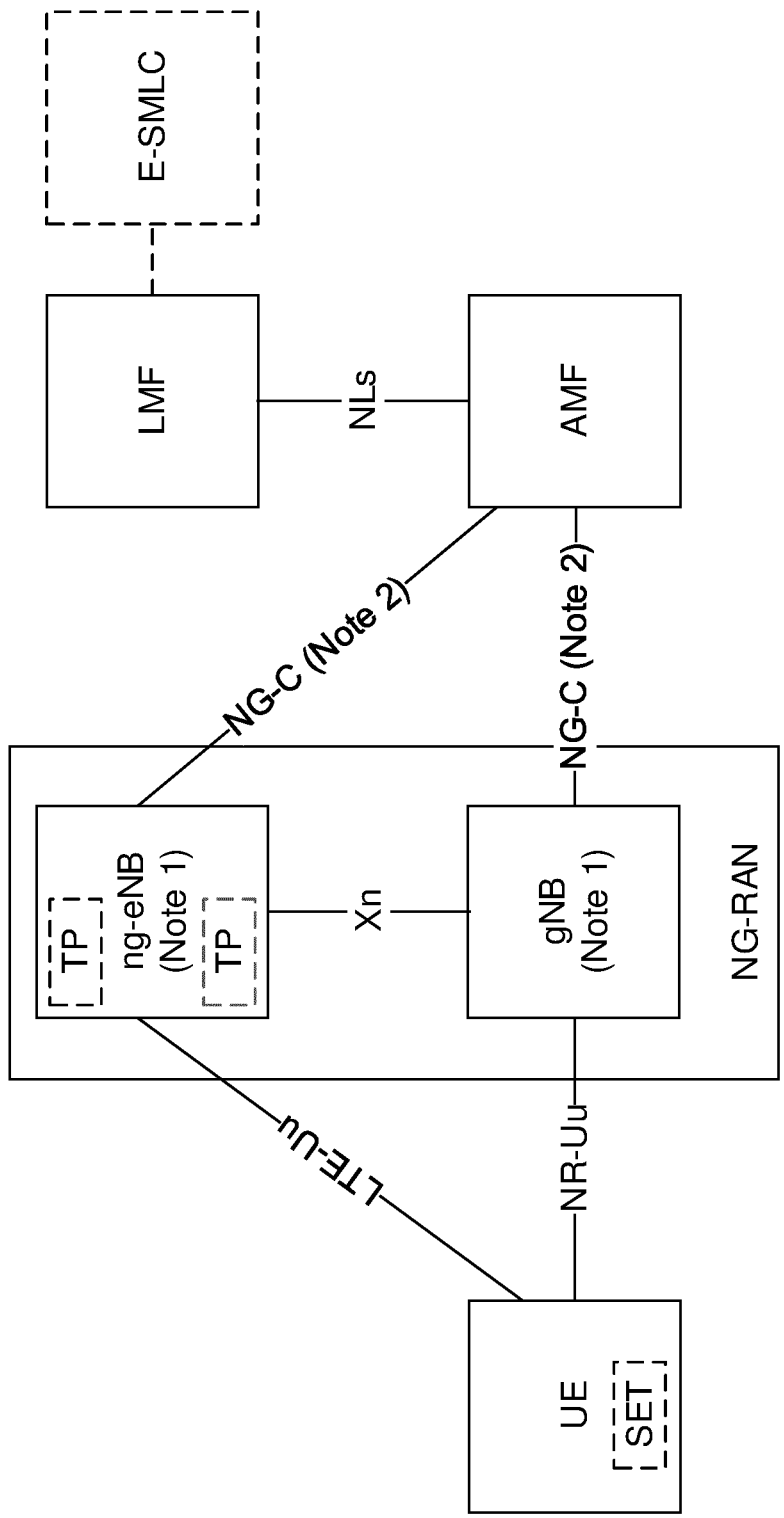
FIG. 1 is an illustration of NR architecture according to the 3GPP technical standards and principles in the present disclosure.
Figure 2:
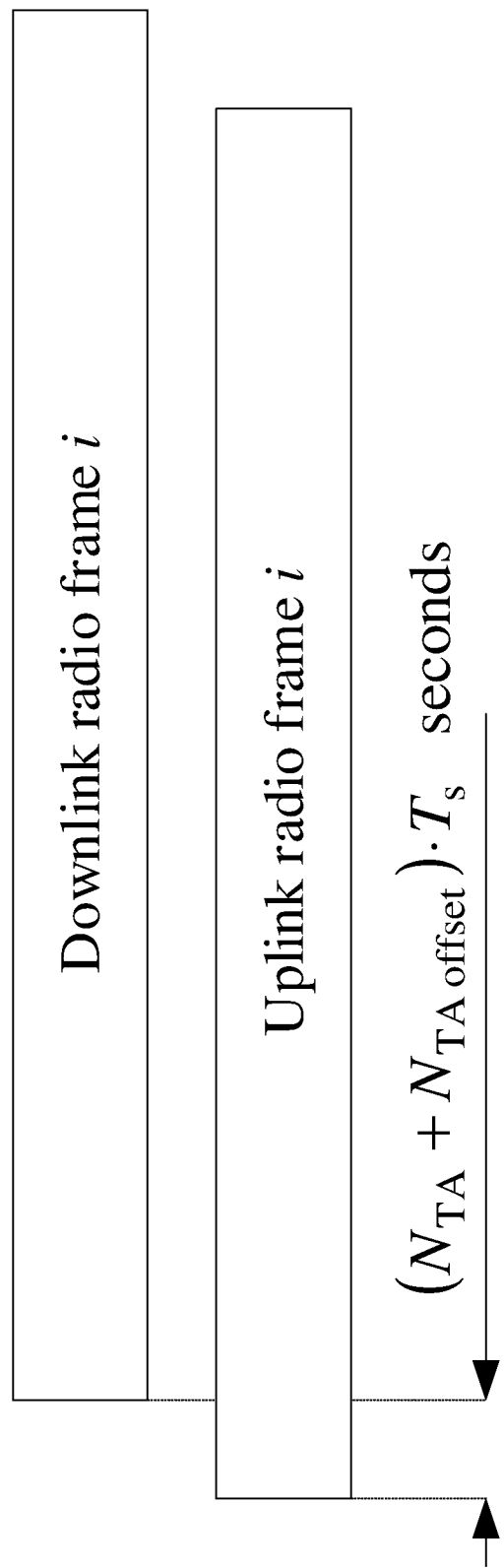
FIG. 2 is an illustration of the uplink-downlink timing relationship in NR according to the principles in the present disclosure.

Before describing in detail exemplary embodiments, it is noted that the embodiments reside primarily in combinations of apparatus components and processing steps related to enhancing the reliability of timing measurements used for positioning in wireless communication systems. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), positioning node (e.g. evolved serving mobile location center (E-SMLC)), etc. The network node may also comprise test equipment. In this disclosure the term node and/or network node may be used to refer to a network node 16 or a wireless device (WD) 22.

The non-limiting term wireless device (WD) can be used herein to refer to any type of wireless device capable of communicating with a network node or another WD over radio signals, such as a user equipment (UE). The WD may also be a radio communication device, target device, device to device (D2D) WD, vehicular to vehicular (V2V) WDs, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

The term "Node", "Node1", "Node2", "Node3" etc. may be used herein to refer to any kind of node within the communications network, including a wireless device and network node.

Also, in some embodiments the generic term "radio network node" may be used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

The term radio access technology (RAT) may refer to any RAT, e.g. Universal Terrestrial Radio Access (UTRA), Evolved-Universal Terrestrial Radio Access (E-UTRA), narrow band internet of things (NB-IoT), Wi-Fi, Bluetooth, next generation RAT, New Radio (NR), 4G, 5G, etc. Any of the equipment denoted by the term node, network node 16 or radio network node may be capable of supporting a single or multiple RATs.

The term signal or radio signal used herein can be any physical signal or physical channel. Examples of DL physical signals are reference signals such as primary synchronization signals (PSS), secondary synchronization signals (SSS), channel state information reference signals (CSI-RS), demodulation reference signals (DMRS), signals in synchronization signal blocks (SSB), downlink reference signals (DRS), cell specific reference signals (CRS), PRS etc. Examples of UL physical signals are reference signal such as SRS, DMRS, etc. The term physical channel refers to any channel carrying higher layer information e.g. data, control etc. Examples of physical channels are the physical broadcast channel (PBCH), narrowband physical broadcast channel (NPBCH), physical downlink control channel (PDCCH), physical downlink shared channel (PDSCH), short physical uplink control channel (sPUCCH), short physical downlink shared channel (sPDSCH). short physical uplink shared channel (sPUSCH), MPDCCH, narrowband physical downlink control channel (NPDCCH), narrowband physical downlink shared channel (NPDSCH), evolved physical downlink control channel (E-PDCCH), physical uplink shared channel (PUSCH), physical uplink control channel (PUCCH), narrowband physical uplink shared channel (NPUSCH), etc.

The term time resource used herein may correspond to any type of physical resource or radio resource expressed in terms of length of time. Examples of time resources are symbols, time slots, subframes, radio frames, TTI, interleaving time, slots, sub-slots, mini-slots, etc.

A round trip time (RTT) measurement performed by a first network node (Node1) is a relationship between two timing measurement components: a first component comprising measuring reception timing ($T_{RX}$) of a signal received by Node1 from a second node (Node2) and a second component comprising measuring transmission timing ($T_{TX}$) of a signal transmitted by Node1. An example of the relationship may be the difference between $T_{RX}$ and $T_{TX}$ (e.g. $T_{RX}-T_{TX}$). RTT is also called a bidirectional timing measurement. Examples of RTT measurements are WD RX-TX time difference measurements, network node16 RX-TX time difference measurements, timing advances, propagation delays etc.

The term multi-round trip (multi-RTT) measurement used herein correspond to any WD 22 measurement comprising at least one RTT measurement on signals of one serving cell or TRP (e.g. primary cell (PCell), primary serving cell (PSCell) etc.) and at least one RTT measurement on signals of another cell or TRP (e.g. a neighbor cell, another serving cell etc.). Examples of multi-RTT measurements are multi-RTT positioning measurements such as multiple WD 22 RX-TX time difference measurements involving two or more cells, timing advances, combination of or difference between two RTT measurements, etc.

The term time offset ($T_{offset}$) used herein comprises time differences or timing relationships between the DL reception timing at the WD (e.g. timing of DL frame i) and the UL transmit timing at the WD (e.g. timing of corresponding UL frame i). The parameter $T_{offset}$ may comprise dynamic or variable time offsets (VTO) (e.g. $N_{TA}$ based on TA) and/or a fixed time offset (FTO) (e.g. $N_{TA,offset}$).

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 3:
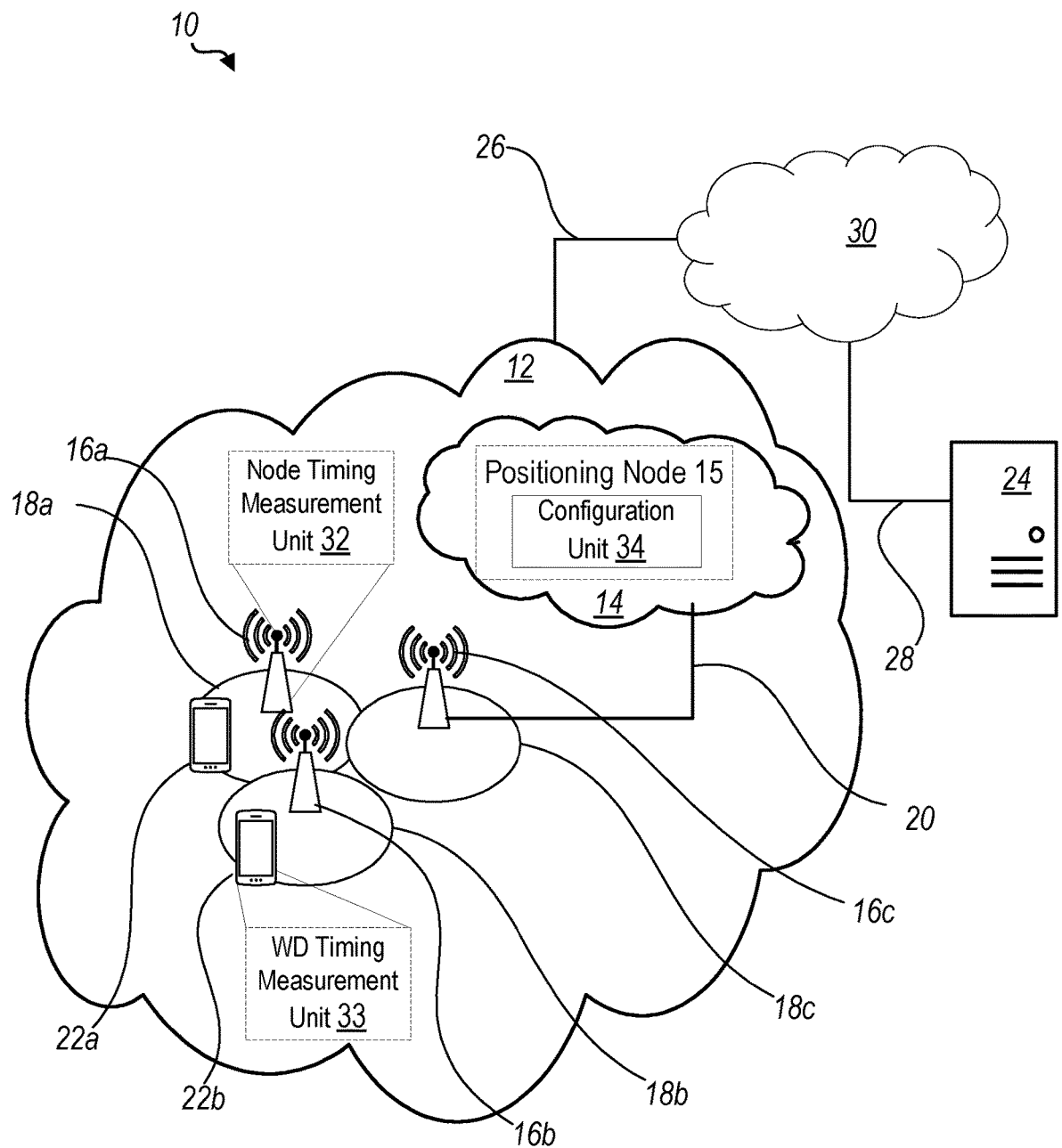
FIG. 3 is a schematic diagram of an exemplary network architecture illustrating a communication system connected via an intermediate network to a host computer according to the principles in the present disclosure.

Embodiments provide for enhancing the reliability of timing measurements used for positioning in wireless communication systems. Referring now to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. In one or more embodiments, core network 14 may include one or more positioning nodes 17, as described herein. Alternatively, positioning node 17 may be part of the access network 12. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a node timing measurement unit 32 which is configured to perform one or more network node 16 functions described herein such as at least one timing measurement over a measurement period (T1) on signals transmitted between the network node and a WD or second network node; during T1, determine if there is any change in a fixed time offset (FTO) used by the network node for transmitting a reference signal to the WD or second network node; if there is a change in the FTO over T1, perform at least one operational task; and if there is no change in the FTO over T1, continue performing the timing measurement over T1. A wireless device 22 is configured to include a WD timing measurement unit 33 which is configured to perform one or more wireless device 22 functions described herein such as at least one timing measurement over a measurement period (T1) on signals transmitted between the WD and the second WD or network node; during T1, determine if there is any change in a fixed time offset (FTO) used by the WD for transmitting a reference signal to the second WD or network node; if there is a change in the FTO over T1, perform at least one operational task; and if there is no change in the FTO over T1, continue performing the timing measurement over T1.

Example implementations, in accordance with an embodiment, of the WD 22, network node 16 and host computer 24 discussed in the preceding paragraphs will now be described with reference to FIG. 4. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include a node timing measurement unit 32 configured to perform one or more network node 16 functions described herein such as at least one timing measurement over a measurement period (T1) on signals transmitted between the network node and a WD or second network node; during T1, determine if there is any change in a fixed time offset (FTO) used by the network node for transmitting a reference signal to the WD or second network node; if there is a change in the FTO over T1, perform at least one operational task; and if there is no change in the FTO over T1, continue performing the timing measurement over T1.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a include a WD timing measurement unit 33 configured to perform one or more wireless device 22 functions described herein such as at least one timing measurement over a measurement period (T1) on signals transmitted between the WD and the second WD or network node; during T1, determine if there is any change in a fixed time offset (FTO) used by the WD for transmitting a reference signal to the second WD or network node; if there is a change in the FTO over T1, perform at least one operational task; and if there is no change in the FTO over T1, continue performing the timing measurement over T1.

In some embodiments, the communication system 10 further includes a positioning node provided in a communication system 10 and including hardware 94 enabling it to communicate with one or more of the host computer 24, the network node 16 and the WD 22. The hardware 94 may include a communication interface 96 for setting up and maintaining a wired or wireless connection with an interface of a different communication device of the communication system 10, as well as an optional radio interface 98 for setting up and maintaining at least a wireless connection 64 with a WD 22 such as if positioning node 15 is implement outside of core network 14 as a base station or transmission reception point. The radio interface 98 may be formed as or may include, for example, one or more RF transmitters, one or more RF receivers, and/or one or more RF transceivers. The communication interface 96 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 94 of the positioning node 15 further includes processing circuitry 100. The processing circuitry 100 may include a processor 102 and a memory 104. In particular, in addition to or instead of a processor, such as a central processing unit, and memory, the processing circuitry 100 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 102 may be configured to access (e.g., write to and/or read from) the memory 104, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the positioning node 15 further has software 106 stored internally in, for example, memory 104, or stored in external memory (e.g., database, storage array, network storage device, etc.) accessible by the positioning node 15 via an external connection. The software 74 may be executable by the processing circuitry 100. The processing circuitry 100 may be configured to control any of the methods and/or processes described herein and/or to cause such methods, and/or processes to be performed, e.g., by network node 16. Processor 102 corresponds to one or more processors 102 for performing positioning node 15 functions described herein. The memory 104 is configured to store data, programmatic software code and/or other information described herein. In some embodiments, the software 106 may include instructions that, when executed by the processor 102 and/or processing circuitry 100, causes the processor 102 and/or processing circuitry 100 to perform the processes described herein with respect to positioning node 15. For example, processing circuitry 100 of the positioning node 15 may include a configuration unit 34 configured to perform one or more positioning node 15 functions such as with respect to positioning timing measurement procedures associated with a fixed time offset, as described herein.

In one or more embodiments, positioning node 15 may be any one of SON/O&M node, serving node, network node, TRP, wireless device 22 such that, depending on, for example, implementation, positioning node 15 may be logically part of the core network 14 or logically part of access network 12 such as one of co-located network node 16, acting as network node 16, etc.

Figure 4:
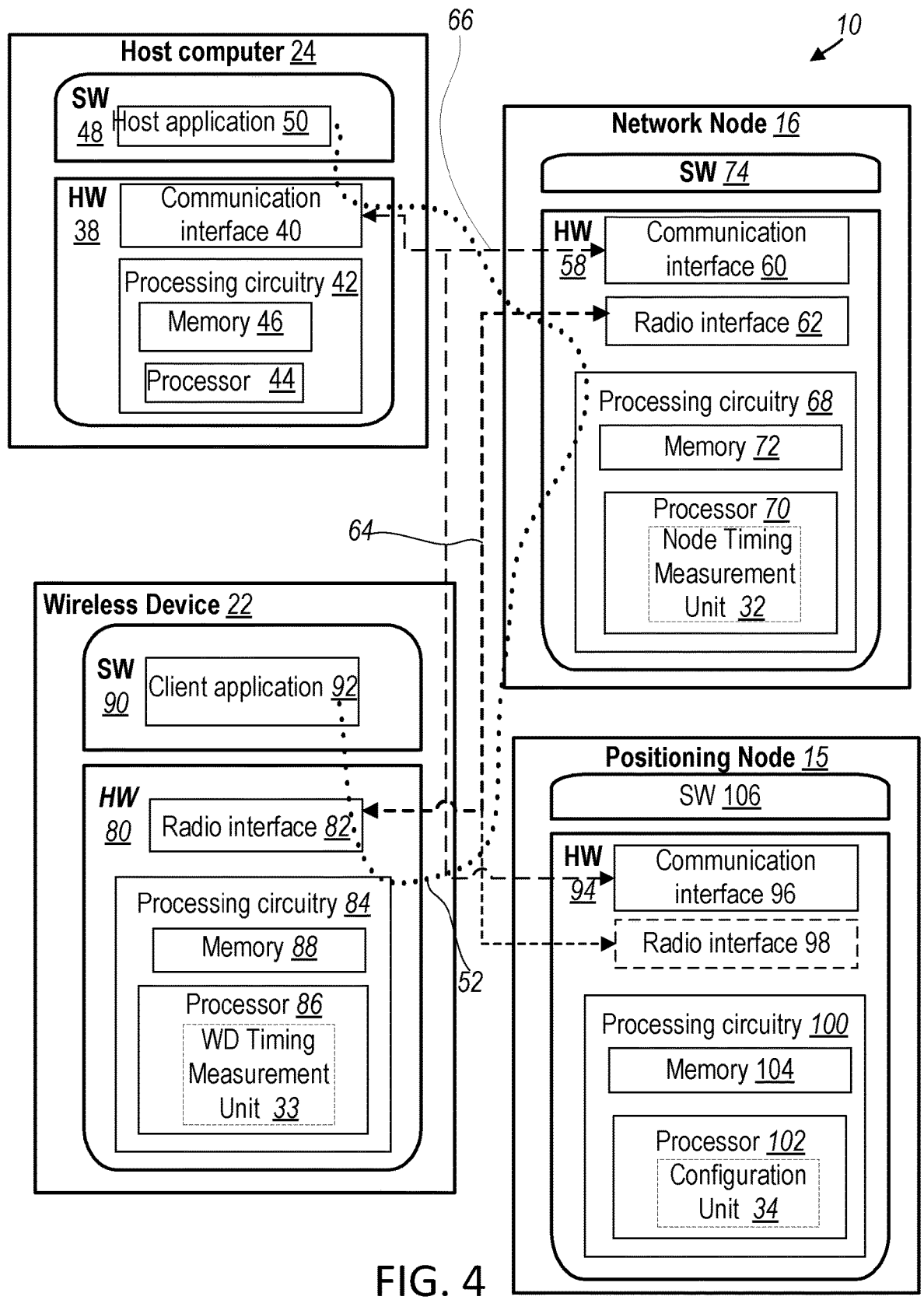
FIG. 4 is a block diagram of a host computer communicating via a network node with a wireless device over an at least partially wireless connection according to some embodiments of the present disclosure.

In some embodiments, the inner workings of the positioning node 15, network node 16, WD 22, and host computer 24 may be as shown in FIG. 4 and independently, the surrounding network topology may be that of FIG. 3.

In FIG. 4, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 among one or more of the WD 22, the network node 16 and the positioning node 15 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22. In some embodiments, the positioning node 15 may be configured to, and/or the positioning node's 15 processing circuitry 100 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16 or positioning node 15 (in some embodiments). In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16/positioning node 15, and/or preparing/terminating/maintaining/supporting/ending in receipt of a transmission from the network node 16/positioning node 15.

Although FIGS. 3 and 4 show various "units" such as timing measurement unit 32, and configuration unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 5 is a flowchart illustrating an exemplary method implemented in a communication system, such as, for example, the communication system of FIGS. 3 and 4, in accordance with one embodiment. The communication system may include a host computer 24, a network node 16 and a WD 22, which may be those described with reference to FIG. 4. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 6 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 7, 8:
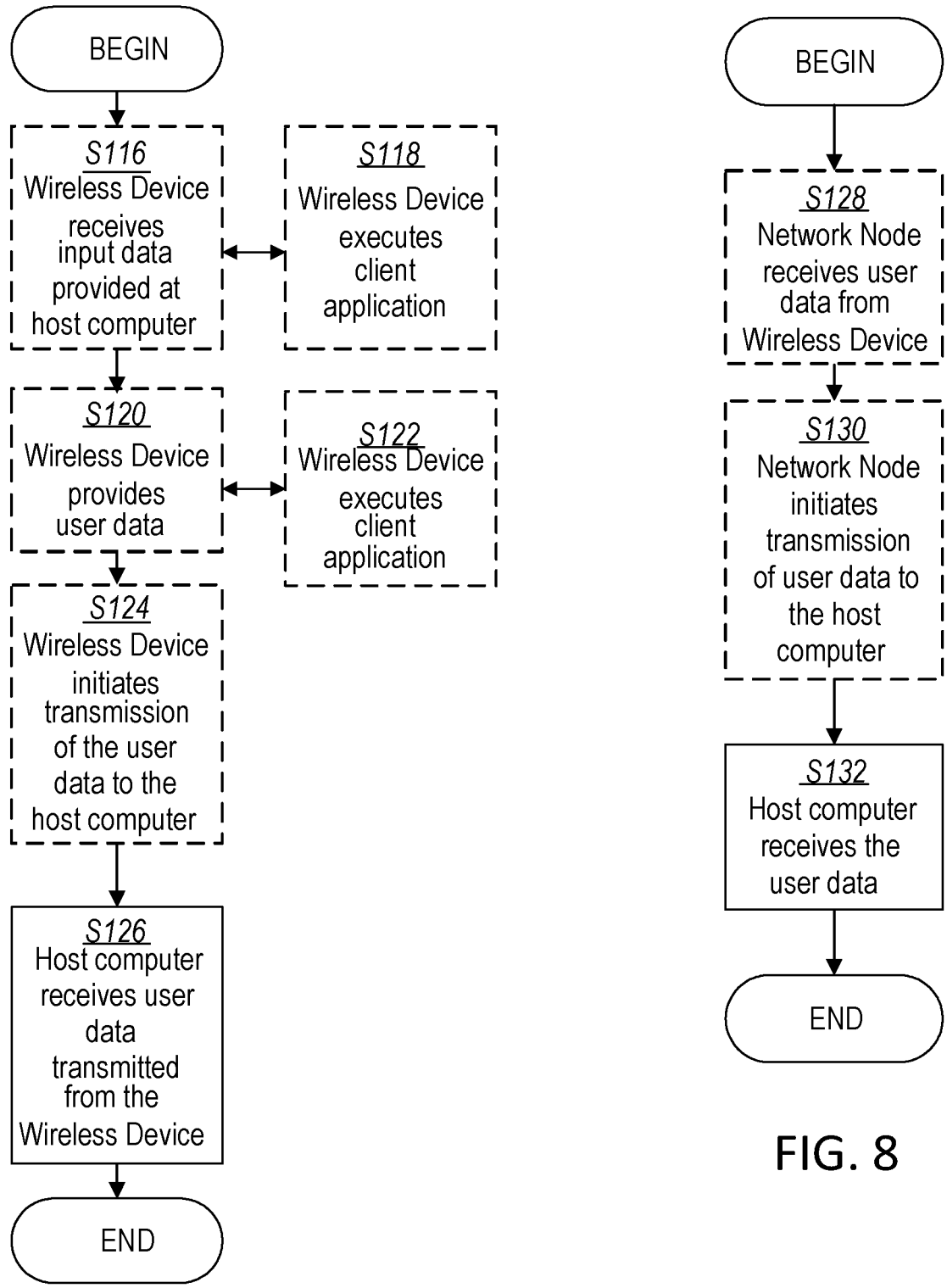
FIG. 7 is a flowchart illustrating exemplary methods implemented in a communication system including a host computer, a network node and a wireless device for receiving user data from the wireless device at a host computer according to some embodiments of the present disclosure.
FIG. 8 is a flowchart illustrating exemplary methods implemented in a communication system including a host computer, a network node and a wireless device for receiving user data at a host computer according to some embodiments of the present disclosure.

FIG. 7 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 8 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 9:
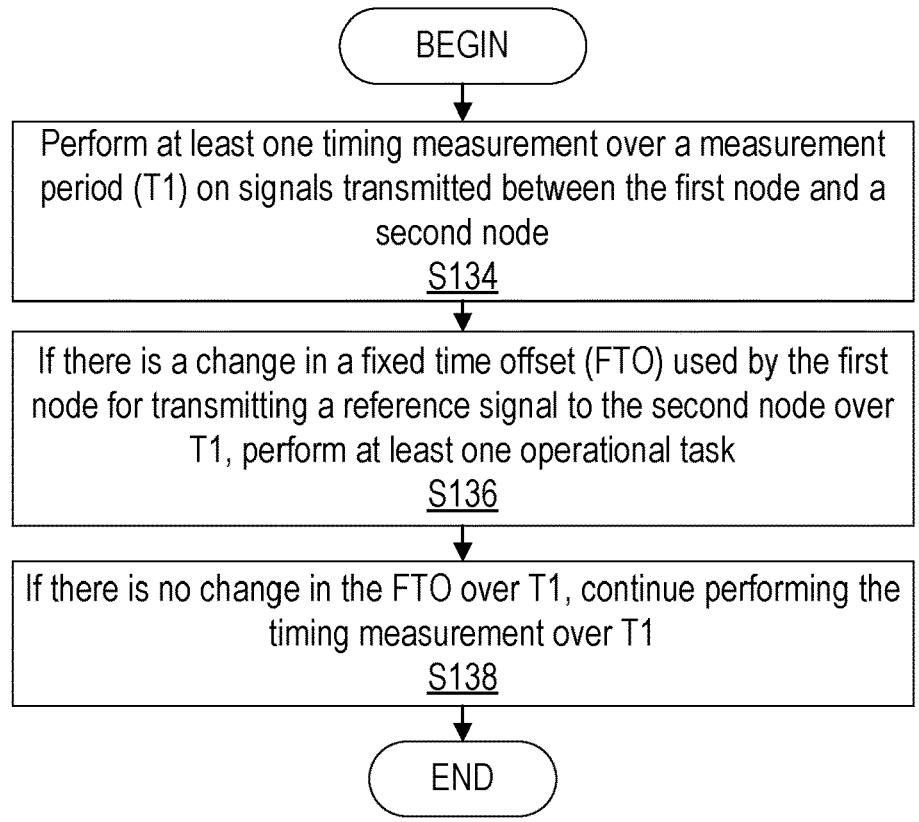
FIG. 9 is a flowchart of an exemplary process in a network node for performing a timing measurement over a measurement period on signals transmitted between the network node and a WD or second network node according to some embodiments of the present disclosure.

FIG. 9 is a flowchart of an exemplary process in a first node for performing a timing measurement over a measurement period on signals transmitted between the network node and a WD or second network node according to some embodiments of the present disclosure. For ease of understanding, FIG. 9 is described with respect to the first node being network node 16. It is understood that the process of FIG. 9 can be implemented using WD 22 as the first node using, for example, WD timing measurement unit 33. One or more Blocks and/or functions performed by the first node, e.g., network node 16, may be performed by one or more elements of network node 16 such as by node timing measurement unit 32 in processing circuitry 68, processor 70, communication interface 60, radio interface 62, etc. In one or more embodiments, network node 16 such as via one or more of processing circuitry 68, processor 70, radio interface 62 and communication interface 60 is configured to perform (Block S134) at least one timing measurement over a measurement period (T1) on signals transmitted between the first node and the second node. Network node 16 such as via one or more of processing circuitry 68, processor 70, radio interface 62 and communication interface 60 is configured to, if there is a change in a fixed time offset (FTO) used by the first node for transmitting a reference signal to the second node over T1, perform (Block S136) at least one operational task. Network node 16 such as via one or more of processing circuitry 68, processor 70, radio interface 62 and communication interface 60 is configured to, if there is no change in the FTO over T1, continue performing (Block S138) the timing measurement over T1.

In one or more embodiments, the first node is further configured to, and/or comprises a radio interface 62 and/or comprises processing circuitry 68 further configured to perform least one timing measurement over a second measurement period (T2) on signals transmitted between the first node and the second node; during T2, determine if there is any change in the FTO used by the second node for receiving the reference signal from the first node; if there is any change in the FTO over T2, perform at least one operational task; and if there is no change in the FTO over T2, continue performing the ongoing timing measurement and complete it over T2.

In one or more embodiments, the timing measurement performed over T1 comprises one or more timing measurements. In one or more embodiments, each timing measurement is a function of two timing measurements: a reception timing of a reference signal received at the first node from the second node; and a transmission timing of a reference signal transmitted by the first node. In one or more embodiments, each timing measurement is a function of one timing measurement: a reception timing of a reference signal received at the first node from the second node with respect to a reference time. In one or more embodiments, the at least one operational task comprises at least one of discarding the timing measurement, restarting the timing measurement, extending the measurement time, informing a third node about a change in the FTO and informing a third node about an action taken by the second node. In one or more embodiments, the first node is a wireless device and the second node is a network node. In one or more embodiments, the first node is a wireless device and the second node is a wireless device. In one or more embodiments, the first node is a network node. In one or more embodiments, the second node is a network node or a wireless device.

Figure 10:
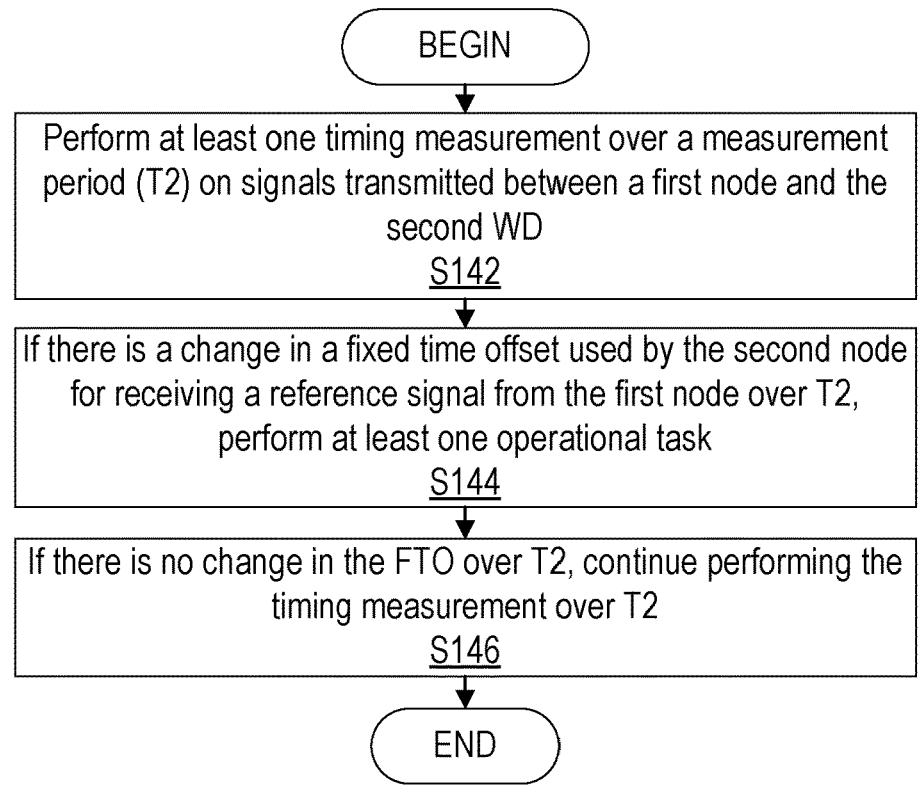
FIG. 10 is a flowchart of an exemplary process in a wireless device for performing a timing measurement over a measurement period on signals transmitted between the WD and a second WD or network node according to some embodiments of the present disclosure.

FIG. 10 is a flowchart of an exemplary process in a second node for performing a timing measurement over a measurement period on signals transmitted between the WD and a second WD or network node according to some embodiments of the present disclosure. For ease of understanding, FIG. 10 is described with respect to the second node being WD 22. It is understood that the process of FIG. 10 can be implemented using network node 16 as the second node. One or more Blocks and/or functions performed by wireless device 22 may be performed by one or more elements of wireless device 22 such as by WD timing measurement unit 33 in processing circuitry 84, processor 86, radio interface 82, etc. In one or more embodiments, wireless device 22 such as via one or more of processing circuitry 84, processor 86 and radio interface 82 is configured to perform (Block S142) at least one timing measurement over a measurement period (T2) on signals transmitted between a first node and the second node. Wireless device 22 such as via one or more of processing circuitry 84, processor 86 and radio interface 82 is configured to, if there is a change in a fixed time offset (FTO) used by the second node, e.g., WD 22, for receiving a reference signal from the first node over T2, perform (Block S144) at least one operational task. Wireless device 22 such as via one or more of processing circuitry 84, processor 86 and radio interface 82 is configured to, if there is no change in the FTO over T2, continue performing (Block S146) the timing measurement over T1.

In one or more embodiments, the timing measurement performed over T2 comprises one or more timing measurements. In one or more embodiments, each timing measurement is a function of two timing measurements: a reception timing of a reference signal received at the second node from the first node; and a transmission timing of a reference signal transmitted by the second node. In one or more embodiments, each timing measurement is a function of one timing measurement: a reception timing of a reference signal received at the second node from the first node with respect to a reference time. In one or more embodiments, the at least one operational task comprises at least one of discarding the timing measurement, restarting the timing measurement, extending the measurement time, informing another network node about a change in the FTO and informing another network node about an action taken by the network node. In one or more embodiments, the second node is a network node. In one or more embodiments, the second node is a wireless device. In one or more embodiments, the first node is a wireless device 22. In one or more embodiments, the first node is a network node 16.

Figure 11:
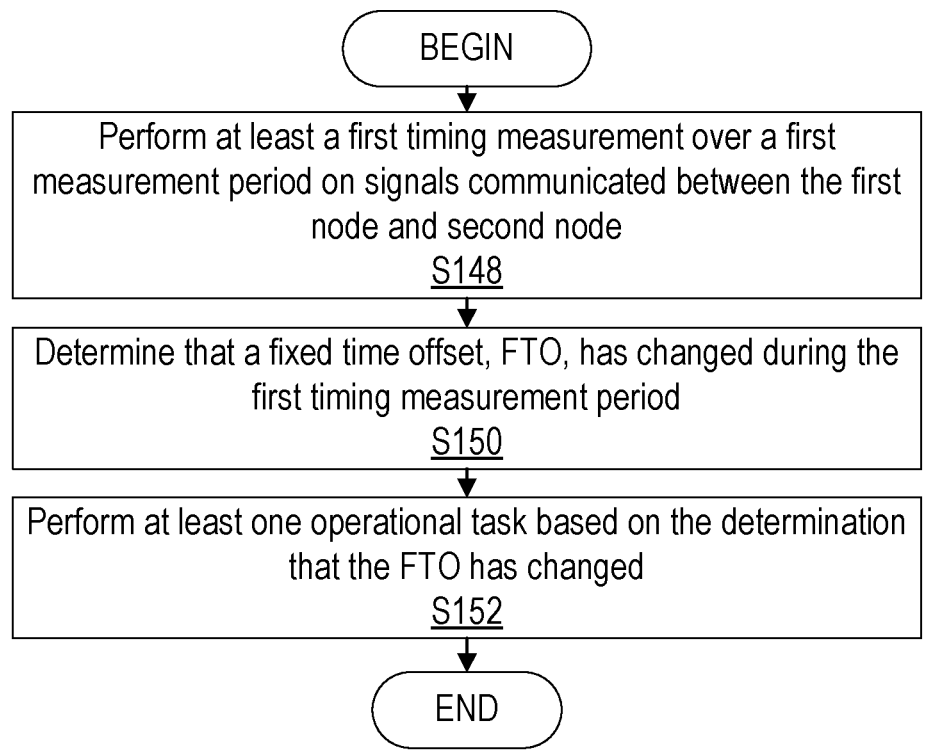
FIG. 11 is a flowchart of another example process in a network node according to some embodiments of the present disclosure.

FIG. 11 is a flowchart of an exemplary process in a first node according to some embodiments of the present disclosure. For ease of understanding, FIG. 11 is described with respect to the first node being network node 16. It is understood that the process of FIG. 11 can be implemented by WD 22. One or more Blocks and/or functions performed by the first node, e.g., node 16, may be performed by one or more elements of network node 16 such as by node timing measurement unit 32 in processing circuitry 68, processor 70, communication interface 60, radio interface 62, etc. Network node 16 is configured to perform (Block S148) at least a first timing measurement over a first measurement period on signals communicated between the first node and second node, as described herein. Network node 16 is configured to determine (Block S150) that a fixed time offset, FTO, has changed during the first timing measurement period, as described herein. Network node 16 is configured to perform (Block S152) at least one operational task based on the determination that the FTO has changed, as described herein.

According to one or more embodiments, the FTO is determined to have changed from a previously configured FTO that is set before the first measurement period. According to one or more embodiments, the at least one operational task includes at least one of: discarding at least the first timing measurement; restarting at least the first timing measurement; and extending the first measurement period. According to one or more embodiments, the at least one operational task includes discarding the first timing measurement.

According to one or more embodiments, the at least one operational task includes one of: informing a third node about the change in the FTO; and informing the third node about the at least one operational task. According to one or more embodiments, the processing circuitry 68 is further configured to, after performing the at least one operational task, receive an indication of a modified FTO to implement. According to one or more embodiments, the first node is a wireless device 22 and the second node is a base station 16.

According to one or more embodiments, the first node is a wireless device 22 and the second node is a wireless device 22. According to one or more embodiments, the signals communicated between the first node and second node include at least a first signal transmitted by the first node; and at least a second signal received from the second node. According to one or more embodiments, the first node is configured to transmit the first signal at a time instance T1 occurring at least the FTO before the second signal is received from the second node.

According to one or more embodiments, the first and second signals are reference signals. According to one or more embodiments, the processing circuitry 68 is further configured to: perform at least a second timing measurement over a second measurement period on signals communicated between the first and second node; determine that the FTO has not changed based on at least the second timing measurement; and continue performing at least the second timing measurement over second measurement period. According to one or more embodiments, the first node is configured to communicate with the second node according to New Radio, NR, Radio Access Technology, RAT, and the FTO corresponds to parameter $N_{TA\ offset}$.

Figure 12:
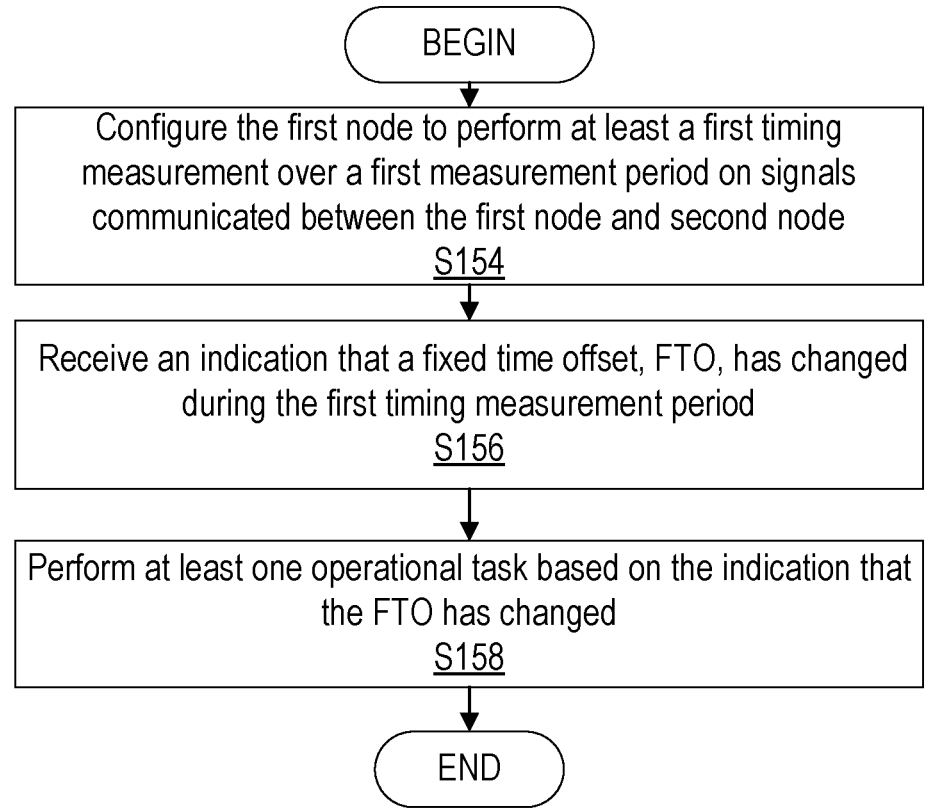
FIG. 12 is a flowchart of an example process in a positioning node according to some embodiments of the present disclosure.

FIG. 12 is a flowchart of an exemplary process in a positioning node 15 according to some embodiments of the present disclosure. One or more Blocks and/or functions performed by positioning node 15 may be performed by one or more elements of positioning node 15 such as by configuration unit 34 in processing circuitry 100, processor 102, communication interface 96, radio interface 98, etc. The positioning node 15 may be in communication with the first node and second node that are configured to communicate signals with each other. Positioning node 15 is configured to configure (Block S154) the first node to perform at least a first timing measurement over a first measurement period on signals communicated between the first node and second node, as described herein. Positioning node 15 is configured to receive (Block S156) an indication that a fixed time offset, FTO, has changed during the first timing measurement period, as described herein. Positioning node 15 is configured to perform (Block S158) at least one operational task based on the indication that the FTO has changed, as described herein.

According to one or more embodiments, the processing circuitry 100 is further configured to: receive an indication from the first node that at least one operational measurement task has been performed by the first node. According to one or more embodiments, the FTO changed from a previously configured FTO that is set before the first measurement period. According to one or more embodiments, the at least one operational task includes at least one of: discarding at least the first timing measurement; restarting at least the first timing measurement; extending the first measurement period; reconfiguring the first measurement; configuring the first node with a new measurement; compensating the received first timing measurement to account for the FTO change; and indicate to the first node to implement a modified FTO.

According to one or more embodiments, the at least operational task includes discarding the first timing measurement. According to one or more embodiments, the first node is wireless device 22 and the second node is a base station 16. According to one or more embodiments, the first node is a wireless device 22 and the second node is a wireless device 22. According to one or more embodiments, the signals communicated between the first node and second node include: at least a first signal transmitted by the first node; and at least a second signal received at the first node from the second node;

According to one or more embodiments, the first node is configured to transmit the first signal at a time instance T1 occurring at least the FTO before the second signal is received from the second node. According to one or more embodiments, the first and second signals are reference signals. According to one or more embodiments, the positioning node 15 is configured to communicate with the first node and the second node according to New Radio, NR, Radio Access Technology, RAT, and the FTO corresponds to parameter $N_{TA\ offset}$.

It is understood that the process of FIG. 12 can be implemented by WD 22 or network node 16 acting as a positioning node 15 where WD 22 and/or network node 16 are configured with configuration unit 34.

Having described the general process flow of arrangements of the disclosure and having provided examples of hardware and software arrangements for implementing the processes and functions of the disclosure, the sections below provide details and examples of arrangements for enhancing the reliability of timing measurements used for positioning in wireless communication systems as compared with known arrangements, which may be implemented by one or more of positioning node 15, network node 16 and wireless device 22.

As used below, a first node may correspond to any one of network node 16 and wireless device. One or more first node functions described below may be performed by, for example, network node 16 or wireless device 22 such by using the hardware and/or software described above. As used below, a second node may correspond to any one of network node 16 and wireless device 22. One or more second node functions described below may be performed by, for example, network node 16 or wireless device 22 such by using the hardware and/or software described above. One or more positioning node 15 functions described here may be performed by one or more of processing circuitry 100, processor 102, radio interface 98, configuration unit 34, etc.

Embodiments

Scenario

Various embodiments may include at least one first node (Node1) and at least one second node (Node2). Node1 or Node2 may be configured by a third network node (Node3) to perform timing measurements on signals operating between Node1 and Node2.

The timing measurements can be bidirectional (e.g., WD 22 or network node 16 Rx-Tx time difference) or unidirectional (e.g. UL RTOA). The term operating a signal between nodes includes one node transmitting the signal to node and/or one node receiving the signal from another node. Examples of signals are reference signals, pilot signals, etc.

Node1 can be configured to transmit at least a first reference (RS1). Node2 can be configured to transmit a second reference (RS2). At least one of Node1 and Node2 may further be configured with a low activity level, e.g., with discontinuous reception (DRX), discontinuous transmission (DTX), and/or control channel monitoring patterns.

A difference between Node1 and Node2 may be that Node1 can be configured to a transmit signal (e.g., RS1) at a time instance (T1), which occurs at least FTO (e.g., $N_{TA\ offset}$) before the reception of the signal (e.g., RS2) from Node2.

Node1 and Node2 may have different characteristics and correspond to different physical components within the communications network in different timing measurement scenarios. For example, in some scenarios Node1 is a wireless device and in others a network node; and in some scenarios Node 2 is a network node and in others a wireless device. This will be explained in the scenarios below.

Bidirectional Timing Measurement Scenarios:

In a first exemplary scenario for bidirectional timing measurement, Node1 and Node2 are WD 22 and network node 16 (NN) respectively. In this case the timing measurement may be performed by the WD 22 and/or by the NN 16 on signals operating between the WD 22 and the NN 16. In one non-limiting example RS1 and RS2 are SRS and PRS respectively. This scenario is illustrated in FIG. 13.

In a second exemplary scenario for bidirectional timing measurement, Node1 and Node2 are WD 22a and WD 22b respectively and are capable of D2D operation (e.g., V2X, Prose, etc.). In this case, the timing measurement may be performed by WD 22b and/or by WD 22a on signals operating between WD 22a and WD 22b. In one example RS1 and RS2 are SRS and SRS respectively. In another example RS1 and RS2 are SRS and PRS respectively. This scenario is illustrated in FIG. 14.

FIGS. 13 and 14 are illustrations of examples of Node1 or Node 2, network nodes 16, performing bi-directional timing measurements. In FIG. 13, Node1 is WD 22, Node2 is network node 16, RS1 is SRS and RS2 is PRS; In FIG. 14, Node1 is WD 22a, Node2 is WD 22b, RS1 and RS2 can be any RS transmitted by WD 22a and WD 22b respectively, e.g., RS1 and RS2 are both SRS.

Unidirectional Timing Measurement Scenarios:

In a first example scenario for unidirectional timing measurement, Node1 and Node2 are NN 16 and WD 22 respectively. In this case the timing measurement (e.g., reception timing of WD 22) may be performed by the NN 16 on reference signals transmitted by the WD 22. In one example RS1 is SRS. NN 16 may or may not transmit RS2. This scenario is illustrated in FIG. 15.

In a second example scenario for unidirectional timing measurement, Node1 and Node2 are WD 22a and WD 22b respectively and may be capable of D2D operation (e.g., V2X, Prose etc.). In this case, the timing measurement (e.g., reception timing of WD 22a) is performed by WD 22b on signals transmitted by WD 22b. In one example RS1 is SRS. In another example RS1 is PRS. WD 22b may or may not transmit RS2. This scenario is illustrated in FIG. 16.

FIGS. 15 and 16 are illustrations of examples of a network node 16 performing unidirectional timing measurements. In FIG. 15, Node1 is WD 22, Node2 is network node 16, RS1 is SRS and RS2 is PRS. In FIG. 16, Node1 is WD 22a, Node2 is WD 22b, RS1 and RS2 can be any RS transmitted by WD 22a and WD 22b respectively e.g. RS1 and RS2 are both SRS. In another example (not shown) Node1 is network node 16, Node2 is WD 22, RS1 is PRS and RS2 is SRS.

Node1 or Node2j, for example network node 16, may also be configured to perform multi-RTT measurements on signals operating between Node1 and one or more Node2j (j≤k e.g. N21, N22 . . . , N2k). $RS_{1k}$ is RS transmitted by Node1 to N2k (i.e. kth Node2). $RS_{2k}$ is RS transmitted by Node2k to Node1. As special case Node1 transmits the same RS regardless of number of Node2s i.e. $R1=RS_{11}=RS_{12} \ldots, =RS_{1k}$. This arrangement is shown in FIGS. 17 and 18.

Figure 17:
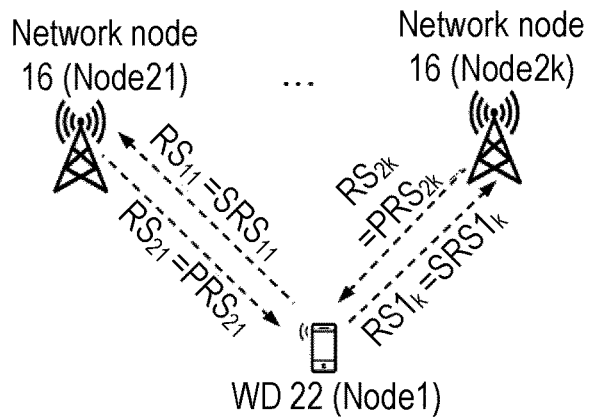
FIG. 17 is an example of network nodes performing multi-RTT measurements according to some embodiments of the present disclosure.
Figure 18:
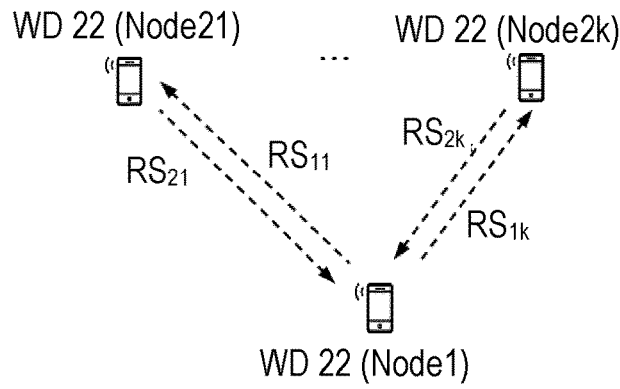
FIG. 18 is another example of network nodes performing multi-RTT measurements according to some embodiments of the present disclosure.

FIGS. 17 and 18 are illustrations of examples of Node1 or Node2j performing multi-RTT measurements. In FIG. 17, Node1 is WD 22, Node2s are network nodes 16, $RS_{1k}$ is SRS and $RS_{2k}$ is PRS. In FIG. 18, Node1 is WD 22a, Node2s are WDs 22b, $RS_{1k}$ and $RS_{2k}$ can be any RS transmitted by WD 22a and WD 22b respectively e.g. $RS_{1k}$ and $RS_{2k}$ are both SRS.

Node3, for example network node 16 may or may not be different from Node1 and Node2. Node3 may be, e.g., a SON/O&M node, a serving or other BS or TRP, positioning node, WD 22, etc. Node3 may configure at least one of an RTT measurement to be performed by Node1, an RTT measurement to be performed by Node2, a RS1 transmission and a RS2 transmission.

Embodiment #1: Method in Node1 of a Timing Measurement Procedure

According to a first embodiment, Node1, (such as network node 16 or wireless device 22 depending on the scenario), is configured to perform least one timing measurement over a measurement period (T1) on signals transmitted between Node1 and Node2, and during T1, Node1 determines if there is any change in the FTO used by Node1 for transmitting RS1 to Node2. If there is any change in the FTO over T1 then Node1 performs one or more operational tasks as described herein. But if there is no change in the FTO over T1 then Node1 continues performing the ongoing timing measurement and completes it over T1.

The timing measurement performed over T1 includes one or more measurement samples. For example, over T1, multiple samples can be combined by Node1 based on a function (e.g., mean) to achieve a certain timing measurement accuracy, e.g., accurate within ±x1 Tc, where as an example x1=256. The measurement sample is also interchangeably called as sample, snapshot, measured value etc. In bidirectional timing measurement (e.g., RTT) each sample is function of two timing measurement components:

a first component comprising reception timing ($T_{RX}$) of RS2 received by Node1 from Node2 and a second component comprising transmission timing ($T_{TX}$) of RS1 transmitted by Node1

In one example each sample is the difference (ΔT) between $T_{RX}$ and $T_{TX}$ e.g. $\Delta T = T_{RX} - T_{TX}$.

In unidirectional timing measurement (e.g., RTT) each sample is a function of one timing measurement component:

a first component comprising reception timing ($T_{RX}$) of RS2 received by Node1 from Node2 with respect to a reference time ($T_r$)

In one example each sample is the difference (ΔT) between $T_{RX}$ and $T_r$, e.g., $\Delta T = T_{RX} - T_r$ or $\Delta T = T_r - T_{RX}$.

Assume that Node1 is initially configured with a certain FTO (e.g., FTO1 such as $N_{TA\ offset}=0$) for deriving the timing for transmitting signals to Node2. During T1, Node1 may further be configured (or reconfigured) to use another FTO value (e.g., FTO2 such as $N_{TA\ offset}=25600$ Tc) for deriving the timing for transmitting signals to Node2. The FTO may be applicable for one or multiple carriers of one or more frequency bands. In one example, FTO1 is configured if a carrier (F1) on which Node1 and Node2 operate signals for doing timing measurements is shared between NR and another RAT (e.g., E-UTRAN, NB-IoT, etc.) e.g. if FTO=0. In another example, FTO2 may be configured if F2 is used only for NR operation. The reconfiguration of FTO will require Node1 to change the FTO from FTO1 to FTO2. Node1 may change or modify or reconfigure the FTO (from FTO1 to FTO2) within the time period from the moment the reconfiguration is triggered in network node 16, e.g. within the reconfiguration delay such as within ×2 ms. Upon being configured with the new FTO the old FTO is discarded and Node1 starts using the new FTO for deriving its UL transmit timing for transmitting signals to Node2. Node1 can determine if there is any change in the FTO over T1 based on one of more of the following principles:

1. In one example, the reconfiguration of FTO triggered in Node1 (e.g., WD 22) based on an explicit message received from another node (e.g. Node2, another WD 22, a network node16, etc.). The message contains information about the new FTO which may be used by Node1 for transmitting the signals. The information may comprise for example the identifier of one of the FTO values, actual value of FTO etc.
2. In another example, the reconfiguration of FTO is triggered in Node1, e.g., WD 22, based on an implicit message received from another node e.g. information that requires Node1 to apply a particular FTO value for deriving its UL transmission. For example, assume currently on the carrier, F1, on which Node1 and Node2 operate signals for doing timing measurements are used only for NR and therefore Node1 applies FTO2 (e.g., 25600 Tc) for deriving its UL timing. If Node1 is informed that from now onwards F1 will be shared between NR and E-UTRAN operations and F1 is an FDD carrier then Node1 changes FTO2 to FTO1 (e.g., 0). But if Node1 is informed that from now onwards F1 will be shared between NR and E-UTRAN operations and F1 is a TDD carrier then Node1 changes FTO2 to FTO3 (e.g., 39936 Tc).

Figure 19:
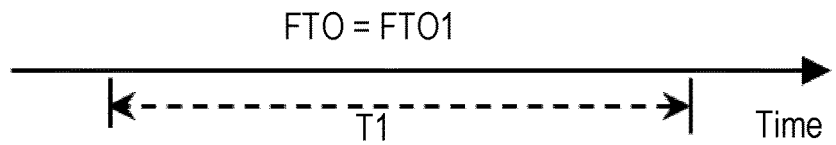
FIG. 19 is an example of fixed time offsets during a timing measurement period according to some embodiments of the present disclosure.
Figure 20:
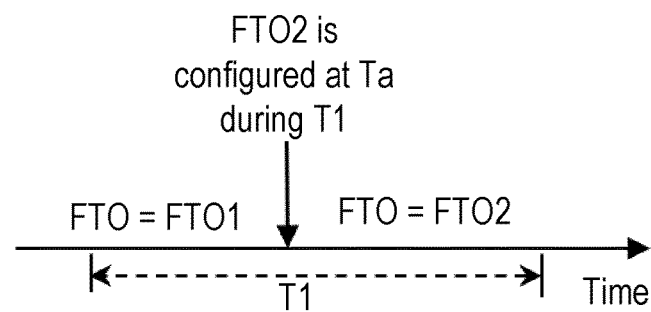
FIG. 20 is another example of fixed time offsets during a timing measurement period according to some embodiments of the present disclosure.

FIG. 19 shows an example where FTO does not change over T1, e.g., remains FTO1 during T1. FIG. 20 shows an example where FTO changes over T1, e.g., from FTO1 to FTO2.

If FTO changes over T1 then the examples of tasks that may be performed may comprise one or more of:
Discarding the timing measurement,
Restarting the timing measurement,
Extending the measurement time by a certain margin and performing the measurement over the extended measurement period e.g. extending T1 to T1' where T1'=f (T1, N) or
Informing another node (e.g., Node2, a third node (Node3)) about change in the FTO during T1.
Informing another node (e.g., Node1, a third node (Node3)) about action taken by Node1 if FTO changed during T1.

The following are examples of the rules, which can be specified in the 3GPP or NR standards and which may require Node1, e.g. network node 16, to determine at least the change in FTO during T1 and perform one or more tasks based on this determination, e.g., Node1 performs timing measurement over T1 provided that at least the FTO is not changed over T1.
Node1 meets one or more requirement for the timing measurement provided that at least the FTO is not changed over T1. An example of requirement is measurement accuracy of the timing measurement, e.g., accurate within ±x3 Tc with respect to the reference measurement. An example of reference measurement is an ideal measurement, predefined value etc. This may require Node1 to discard the ongoing measurement.
Node1 performs timing measurement over T1' provided that the FTO is changed at least once over T1.

FIGS. 19 and 20 are examples of FTO during T1. In FIG. 19, during T1 the FTO remained unchanged. In FIG. 20, during T1 the FTO changed from FTO1 to FTO2.

Embodiment #2: Method in Node2 of Adapting Timing Measurement Procedure

According to a second embodiment, Node2, e.g., network node 16 wireless device 22 depending on the scenario, may be configured to perform least one timing measurement over a measurement period (T2) on signals transmitted between Node1 and Node2, and during T2, Node2 determines if there is any change in the FTO used by Node2 for receiving RS1 from Node1. If there is a change in the FTO over T1 then Node2 may perform one or more operational tasks as described herein. But if there is no change in the FTO over T2 then Node2 may continue performing the ongoing timing measurement and complete it over T2.

The timing measurement performed over T2 may comprise one or more measurement samples. For example, over T2, multiple samples can be combined by Node2 based on a function (e.g., mean) to achieve a certain timing measurement accuracy, e.g., accurate within ±y1 Tc, where as an example y1=256. In bidirectional timing measurements, (e.g., RTT), each sample may be a function of two timing measurement components:

a first component comprising reception timing (TRX) of RS1 received by Node2 from Node1 and
a second component comprising transmission timing ($T_{TX}$) of RS2 transmitted by Node2

In one example, each sample is the difference (ΔT) between $T_{RX}$ and $T_{TX}$, e.g., $\Delta T = T_{RX} - T_{TX}$.

In unidirectional timing measurements, (e.g., RTT), each sample may be a function of one timing measurement component:

a first component comprises reception timing ($T_{RX}$) of RS1 received by Node2 from Node1 with respect to a reference time ($T_r$)

In one example each sample is the difference (ΔT) between $T_{RX}$ and $T_r$, e.g., $\Delta T = T_{RX} - T_r$ or $\Delta T = T_r - T_{RX}$.

Assume that Node2 is initially configured with a certain FTO (e.g., FTO1 such as $N_{TA\ offset} = 0$) for deriving the reception timing for receiving signals (e.g., RS1) from Node1. Node2 may further be configured (or reconfigured) to use another FTO value (e.g., FTO2 such as $N_{TA\ offset} = 25600$ Tc) for deriving the reception timing for receiving signals from Node1. The FTO may be applicable for one or multiple carriers of one or more frequency bands as described in above. The reconfiguration of FTO may require Node2 to change the reception timing for receiving signals (e.g., RS1) from Node1. Node2 can determine if there is any change in the FTO over T2 based on one of more of the following principles:

1. In one example, the reconfiguration of FTO triggered in Node2 based on an explicit message received from another node (e.g., another WD, a network node, etc.). In one specific example, the other node may be Node2 itself, e.g., gNB, base station. In this case Node2 transmits the message. The message contains information about the new FTO which is to be used by Node1 for transmitting the signals to Node2. The information from comprise for example the identifier of one of the FTO values, actual value of FTO, etc.

2. In another example the reconfiguration of FTO triggered in Node2 based on an implicit message received from another node e.g. information that requires Node1 to apply a particular FTO value for deriving its UL transmission. For example, the information may comprise whether the carrier, F1, on which Node1 and Node2 operate signals for doing timing measurements is used only for NR or is shared between NR and another RAT (e.g. E-UTRAN etc.) as described in an example above with regards to embodiment #1.

If FTO changes over T2 then the examples of tasks may comprise one or more of:

Discarding the timing measurement,

Restarting the timing measurement,

Extending the measurement time by a certain margin and performing the measurement over the extended measurement period, e.g., extending T2 to T2' where T2'=f(T2, N) or Informing another node (e.g., Node1, a third node (Node3)) about change in the FTO during T2, Informing another node (e.g., Node1, a third node (Node3)) about action taken by Node2 if FTO changed during T2.

The following are examples of the rules, which may be specified in the standard and which may require Node2, e.g., network node 16, to determine the change in FTO during T2 and perform one or more tasks, e.g., Node2 performs timing measurement over T2 provided that the FTO is not changed over T2.

Node2 meets one or more requirement for the timing measurement provided that the FTO is not changed over T2. An example of requirement is measurement accuracy of the timing measurement e.g. accurate within ±y2 Tc with respect to a reference measurement. An example of a reference measurement is an ideal measurement, predefined value etc. This may require Node2 to discard the ongoing measurement.

Node2 performs timing measurement over T2' provided that the FTO is changed at least once over T2.

Some Examples:

Example A1. A first node (Node1), configured to communicate with a second node (Node2) in a communication network, the first node configured to, and/or comprising a radio interface 62, 82 and/or comprising processing circuitry 68, 84 configured to:

perform at least one timing measurement over a measurement period (T1) on signals transmitted between the first node and the second node;

if there is a change in a fixed time offset (FTO) used by the first node for transmitting a reference signal to the second node over T1, perform at least one operational task; and if there is no change in the FTO over T1, continue performing the timing measurement over T1.

Example A2. The first node of Example A1, the wherein the second node is further configured to, and/or comprises a radio interface 62, 82 and/or comprises processing circuitry 68, 84 further configured to:

perform least one timing measurement over a second measurement period (T2) on signals transmitted between the first node and the second node;

during T2, determine if there is any change in the FTO used by the second node for receiving the reference signal from the first node;

if there is any change in the FTO over T2, perform at least one operational task; and if there is no change in the FTO over T2, continue performing the ongoing timing measurement and complete it over T2.

Example A3. The first node of any one of Examples A1 and A2, wherein the timing measurement performed over T1 comprises one or more timing measurements.

Example A4. The first node of any one of Examples A1-A3, wherein each timing measurement is a function of two timing measurements: a reception timing of a reference signal received at the first node from the second node; and a transmission timing of a reference signal transmitted by the first node.

Example A5. The first node of any one of Examples A1-A4, wherein each timing measurement is a function of one timing measurement: a reception timing of a reference signal received at the first node from the second node with respect to a reference time.

Example A6. The first node of any one of Examples A1-A5, wherein the at least one operational task comprises at least one of discarding the timing measurement, restarting the timing measurement, extending the measurement time, informing a third node about a change in the FTO and informing a third node about an action taken by the second node.

Example A7: The first node of any of Examples A1-A6, wherein the first node is a wireless device 22 and the second node is a network node 16.

Example A8: The first node of any of Examples A1-A6, wherein the first node is a wireless device 22 and the second node is a wireless device 22.

Example A9: The first node of any of Examples A1-A6, wherein the first node is a network node 16.

Example A10: The first node of Example A9, wherein the second node is a network node 16 or a wireless device 22.

Example B1. A method implemented in a first node, the method comprising:

performing at least one timing measurement over a measurement period (T1) on signals transmitted between the first node and a second node;

if there is a change in a fixed time offset (FTO) used by the first node for transmitting a reference signal to the second node over T1, performing at least one operational task; and if there is no change in the FTO over T1, continue performing the timing measurement over T1.

Example B2. The method of Example B1 further comprising:

performing at least one timing measurement over a second measurement period (T2) on signals transmitted between the network node 16 and the WD 22 or second network node 16; during T2, determine if there is any change in the FTO used by the WD 22 or second network node 16 for receiving the reference signal from the network node 16;

if there is any change in the FTO over T2, perform at least one operational task; and if there is no change in the FTO over T2, continue performing the ongoing timing measurement and complete it over T2.

Example B3. The method of any one of Examples B1 and B2, wherein the timing measurement performed over T1 comprises one or more timing measurements.

Example B4. The method of any one of Examples B1-B3, wherein each timing measurement is a function of two timing measurements: a reception timing of a reference signal received at the first node from the second node; and a transmission timing of a reference signal transmitted by the first node.

Example B5. The method of any one of Examples B1-B4, wherein each timing measurement is a function of one timing measurement: a reception timing of a reference signal received at the first node from the second node with respect to a reference time.

Example B6. The method of any one of Examples B1-B5, wherein the at least one operational task comprises at least one of discarding the timing measurement, restarting the timing measurement, extending the measurement time, informing a third network node 16 about a change in the FTO and informing a third network node 16 about an action taken by the second network node 16.

Example B7: The method of any of Examples B1-B6, wherein the first node is a wireless device 22 and the second node is a network node 16.

Example B8: The method of any of Examples B1-B6, wherein the first node is a wireless device 22 and the second node is a wireless device 22.

Example B9: The method of any of Examples B1-B6, wherein the first node is a network node 16.

Example B10: The method of Example B9, wherein the second node is a network node 16 or a wireless device 22.

Example C1. A second node configured to communicate with a first node, the second node configured to, and/or comprising a radio interface 62 and/or processing circuitry 68 configured to:

perform at least one timing measurement over a measurement period (T2) on signals transmitted between the first node and the second node;

if there is a change in a fixed time offset (FTO) used by the second node for receiving a reference signal from the first node over T2, perform at least one operational task; and if there is no change in the FTO over T2, continue performing the timing measurement over T1.

Example C2. The second node of Example C1, wherein the timing measurement performed over T2 comprises one or more timing measurements.

Example C3. The second node of Example C2, wherein each timing measurement is a function of two timing measurements: a reception timing of a reference signal received at the second node from the first node; and a transmission timing of a reference signal transmitted by the second node.

Example C4. The second node of Example C2, wherein each timing measurement is a function of one timing measurement: a reception timing of a reference signal received at the second node from the first node with respect to a reference time.

Example C5. The second node of any one of Examples C1-C4, wherein the at least one operational task comprises at least one of discarding the timing measurement, restarting the timing measurement, extending the measurement time, informing another network node 16 about a change in the FTO and informing another network node 16 about an action taken by the network node 16.

Example C6. The second node of any one of Examples C1-C5, wherein the second node is a network node 16.

Example C7. The second node of any one of Examples C1-C5, wherein the second node is a wireless device 22.

Example C8. The second node of Example C6 or C7, wherein the first node is a wireless device 22.

Example C9. The second node of Example C6 or C7, wherein the first node is a network node 16.

Example D1. A method implemented in a second node, the method comprising: performing at least one timing measurement over a measurement period (T2) on signals transmitted between a first node and the second node;

if there is a change in a fixed time offset (FTO) used by the second node for receiving a reference signal from the first node over T2, performing at least one operational task; and if there is no change in the FTO over T2, continue performing the timing measurement over T1.

Example D2. The method of Example D1, wherein the timing measurement performed over T2 comprises one or more timing measurements.

Example D3. The method of any one of Examples D2 and D3, wherein each timing measurement is a function of two timing measurements: a reception timing of a reference signal received at the second node from the first node; and a transmission timing of a reference signal transmitted by the second node.

Example D4. The method of any one of Examples D1-D3, wherein each timing measurement is a function of one timing measurement: a reception timing of a reference signal received at the second node from the first node with respect to a reference time.

Example D5. The method of any one of Examples D1-D4, wherein the at least one operational task comprises at least one of discarding the timing measurement, restarting the timing measurement, extending the measurement time, informing another network node 16 about a change in the FTO and informing another network node 16 about an action taken by the network node 16.

Example D6. The method of any one of Examples D1-D5, wherein the second node is a network node 16.

Example D7. The method of any one of Examples D1-D5, wherein the second node is a wireless device 22.

Example D8. The method of Example D6 or D7, wherein the first node is a wireless device 22.

Example D9. The method of Example D6 or D7, wherein the first node is a network node 16.

ADDITIONAL INFORMATION

Below, it is described how features of the present disclosure may be adopted into the technical standards prepared by the 3GPP.

Introduction

WD 22 Rx-Tx time difference measurements, based on 3GPP Rel-16 PRS and 3GPP Rel-16 SRS, can be configured for a serving cell only or can be configured for multiple cells to support multi-RTT positioning method. These measurements can be configured with or without PRS-RSRP measurements.

The following agreements have been made for WD 22 Rx-Tx:
Side conditions:
Serving cell:
Option 1. −6 dB
Option 2. Serving cell side condition for WD 22 Rx-Tx: −3 dB, for FR1 and FR2.
Option 3. Not needed
Reference cell:
Not needed
Accuracy requirements:
Further discuss the applicability of Rx-Tx time difference accuracy requirements under
Cell change
TA change
Proximity of SRS and PRS:
Further discuss the need for proximity condition of SRS and PRS resources in time for WD 22 Rx-Tx time difference measurements
Details For Further Study (FFS)
Also, the following agreements have been made for WD 22 Rx-Tx time difference measurements:
Accuracy requirements:
Accuracy requirements under cell change are FFS
Measurement period/WD 22 behaviour/Accuracy requirements with TA adjustment are FFS
Reporting criteria:
Ecat for WD 22 Rx-Tx time difference is FFS.
Option 1. 1 per positioning session
Option 2. In multi-RTT positioning, each WD 22 Rx-Tx time difference measurement reporting criterion corresponds to one frequency layer with Ecat=1 indicating the total WD 22 Rx-Tx time difference measurement reports according to signalled capabilities
Option 3:
intra-frequency UE Rx-Tx measurements, 1 report capable of WD 22 Rx-Tx measurements and PRS-RSRP measurements (when configured together with the WD 22 Rx-Tx) on at least TBD PRS resources, per intra-frequency layer
inter-frequency WD 22 Rx-Tx measurements, 1 report capable of WD 22 Rx-Tx measurements and PRS-RSRP measurements (when configured together with the WD 22 Rx-Tx) on at least TBD PRS resources, per inter-frequency layer
Other options are not precluded
Proximity of SRS and PRS in WD 22 Rx-Tx time difference measurement: FFS
whether the core measurement and performance requirements for WD 22 Rx-Tx time difference applies if the configured SRS-Slot-offset and SRS-Periodicity parameters for SRS resource for positioning are such that any SRS transmission is within [−X, X] msec of at least one DL PRS resource from each of the TRPs in the assistance data.
Option 1: the above constraint is not needed, i.e., no limit on X
Option 2: the above constraint is needed, X is FFS
Further, the following agreement have been made WD 22 Rx-Tx:
WD 22 Rx-Tx time difference measurement period:
When WD 22 Rx-Tx time difference measurement is configured to be measured along with PRS-RSRP using the same assistance data:
then whether the measurement periods of WD 22 Rx-Tx time difference measurement and PRS-RSRP are the same or not, is FFS.
Otherwise:
In non-DRX the WD 22 Rx-Tx time difference measurement period is FFS.
When DRX is used then whether or not the WD Rx-Tx time difference measurement period depends on DRX cycle may depend on the positioning method; details are FFS.
RAN4 needs to check RAN1/2 agreements if WD 22 Rx-Tx time difference measurement can be configured to be measured along with RSTD using the same assistance data
Side conditions for WD 22 Rx-Tx time difference:
Serving cell:
Side conditions (PRS Es/Iot) for WD 22 Rx-Tx time difference in FR1 are FFS.
Side conditions (PRS Es/Iot) for WD 22 Rx-Tx time difference in FR2 are FFS.
Neighbour cell:
Side conditions (PRS Es/Iot) for WD 22 Rx-Tx time difference and for RSTD measurement in FR1 are the same.
Side conditions (PRS Es/Iot) for WD 22 Rx-Tx time difference and for RSTD measurement in FR2 are the same.
WD 22 Rx-Tx time difference measurement under cell change:
If the cell change occurs on the serving cell where the SRS is configured then after the serving cell change:
the WD 22 restarts the WD 22 Rx-Tx time difference measurement;
otherwise the WD 22 continues the ongoing WD 22 Rx-Tx time difference measurement.

As described in the present disclosure, details are provided on at least in part solving one or more open issues for WD 22 Rx-Tx in NR Rel-16 positioning.

Further Details

WD 22 Rx-Tx Side Conditions for Serving Cell

WD 22 Rx-Tx side conditions for neighbor cells may be the same as for RSTD. No reference cell side conditions may be defined for WD 22 Rx-Tx. The serving cell side conditions, however, remain still open or unresolved. For the serving cell, a typical assumption is −3 dB for side conditions, which is proposed to reuse also for WD 22 Rx-Tx.

Proposal 1: Serving cell side condition for WD 22 Rx-Tx: −3 dB, for FR1 and FR2.

WD 22 Rx-Tx Time Difference Measurement Period

The Impact of SRS Periodicity

The WD 22 Rx-Tx time difference measurement is performed based on PRS but also SRS, both of which are not continuously available unlike CRS in LTE. Furthermore, the PRS and SRS support very large range of periodicities. The PRS resource periodicity ($T_{per}^{PRS}$) comprises: $T_{per}^{PRS} \in 2^{\mu}\{4, 8, 16, 32, 64, 5, 10, 20, 40, 80, 160, 320, 640, 1280, 2560, 5120, 10240, 20480\}$ slots, where $\mu=0, 1, 2, 3$ for PRS SCS of 15, 30, 60 and 120 kHz respectively. $T_{per}^{PRS}=2^{\mu} \cdot 20480$ is not supported for $\mu=0$.

The periodic SRS resource can be configured with one of the following SRS periodicity ($T_{SRS}$):
$T_{SRS} \in \{1, 2, 4, 5, 8, 10, 16, 20, 32, 40, 64, 80, 160, 320, 640, 1280, 2560\}$ slots.

PRS and SRS can be configured independently, with their respective periodicities. Furthermore, SRS is configured by the serving cell via RRC while PRS is configured by LMF via LPP. Furthermore, SRS and PRS may even be on different frequencies. It may therefore be practically impossible to require any dependency between the SRS configuration and PRS configuration.

Observation 1: SRS and PRS are configured by different network nodes 16 (serving cell and LMF, respectively).

Observation 2: SRS and PRS may be on different frequencies (inter-frequency WD 22 Rx-TX).

Observation 3: WD 22 Rx-Tx measurement period depends on the periodicity of SRS signals.

Observation 4: WD 22 Rx-Tx measurement period depends on the periodicity of PRS signals.

Therefore, both the PRS configuration and SRS configuration impact the measurement period of the WD 22 Rx-Tx time difference measurement, e.g., both PRS periodicity and SRS periodicity.

Proposal 2: WD 22 Rx-Tx measurement period depends on max(PRS periodicity, SRS periodicity).

Time Relation Between SRS and PRS

RAN4 (a 3GPP based organization) has discussed the need for a proximity condition of SRS and PRS resources in time for WD 22 Rx-Tx time difference measurements.

In LTE it could happen that UL and DL subframes are quite separated in time and are not available in the same radio frame, e.g., for HD-FDD WD 22. Nevertheless, such WD 22 can still perform WD 22 Rx-Tx measurements. If that happens, the WD 22 is required to compensate for the difference in the received timing of the radio frame with the UL subframe and the radio frame in which it did receive a DL transmission used for $T_{UE-RX}$ estimation.

The same approach can be used in NR.

WD 22 Rx-Tx time difference measurement definition in 3GPP TS 36.214:

The WD 22 Rx-Tx time difference is defined as $T_{UE-RX} - T_{UE-TX}$

Where:

$T_{UE-RX}$ is the WD 22 received timing of downlink radio frame #i from the serving cell, defined by the first detected path in time.

$T_{UE-TX}$ is the WD 22 transmit timing of uplink radio frame #i.

For a HD-FDD WD 22, if the WD 22 does not receive any DL transmission in radio frame #i, it may compensate for the difference in the received timing of radio frame #i and the radio frame in which it did receive a DL transmission used for $T_{UE-RX}$ estimation.

WD 22 Rx-Tx time difference measurement definition in 3GPP TS 38.215:

The WD 22 Rx-Tx time difference is defined as $T_{UE-RX} - T_{UE-TX}$

Where:

$T_{UE-RX}$ is the WD 22 received timing of downlink subframe #i from a positioning node, defined by the first detected path in time.

$T_{UE-TX}$ is the WD 22 transmit timing of uplink subframe #j that is closest in time to the subframe #i received from the positioning node 15.

Proposal 3: The requirements for WD 22 Rx-Tx apply regardless of the time separation between SRS and PRS.

Proposal 4: If the closest subframes #i and #j are separated by more than ½ subframe, the WD 22 may compensate for the difference in the received timing of radio frame #i used for $T_{UE-TX}$ estimation and the subframe #j.

The Impact of Dropped Signals

PRS may not be available occasionally, e.g., in SSB symbols or when the PRS slot is configured as UL slot for the WD 22, which may also impact the measurement period of the WD 22 Rx-Tx time difference measurement which is based on PRS in DL.

Even SRS may not be available in all its configured instances since SRS dropping may occur, which may further impact the measurement period of the WD 22 Rx-Tx time difference measurement.

The measurement period may need to be extended accordingly, to compensate for the number of PRS occasions not available at the WD 22 over a certain time period due to their overlap with SSB symbols, at least when the number of the non-available PRS occasions is large and the SSB symbols location is known to the WD 22.

The exact extension can be further discussed by RAN4. For example, it can be proportional to max($T_{PRS}$, $T_{SRS}$)*X, where $T_{PRS}$ and $T_{SRS}$ are the PRS periodicity and SRS periodicity, respectively, and N is the number of time intervals of length max($T_{PRS}$, $T_{SRS}$) where at least one of PRS and SRS is dropped.

Proposal 5: WD 22 Rx-Tx measurement period is extended by ΔT, to compensate for the number of PRS occasions dropped due to their overlap with SSB symbols.

The maximum for the allowed extension ΔT shall be limited.

Proposal 6: WD 22 Rx-Tx measurement period is extended due to dropped SRS.

Proposal 7: When the measurement period is extended, the increase in the measurement period depends at least on the periodicity of the PRS/SRS resource which has non-available occasions and the number of such non-available PRS/SRS occasions, but may further depend on the measurement gap configuration, DRX, etc.

The extension is proportional to max($T_{PRS}$, $T_{SRS}$)*X, where $T_{PRS}$ and $T_{SRS}$ are the PRS periodicity and SRS periodicity, respectively, and X is the number of time intervals of length max($T_{PRS}$, $T_{SRS}$) where at least one of PRS and SRS is dropped.

Proposal 8: If the number of PRS/SRS occasions not available at the WD 22 exceeds an acceptable limit, the measurement can be dropped, i.e., no further extension of the measurement period is allowed.

WD 22 Rx-Tx Measurement Under $N_{TA\_offset}$ Change

In NR, there are three possible $N_{TA\ offset}$ values for FR1 and one (but likely more in the future) $N_{TA\ offset}$ value for FR2. At least in FR1 the WD 22 can be configured by the network node 16 with one of the three possible $N_{TA\ offset}$ values. The $N_{TA\ offset}$ introduces a bias in the timing measurement which involves measurement on at least the signal transmitted by the WD 22. The bias will induce substantial error in the positioning accuracy. The bias can be removed by the network (e.g. positioning node, base station, etc.) if the same $N_{TA\ offset}$ is consistently used during the measurement period. However, any change in the $N_{TA\ offset}$ during the measurement period may lead to unpredictable bias which in turn may lead to failing the positioning.

Proposal 9: The requirements for WD 22 Rx-Tx tine difference measurement apply, provided the $N_{TA\ offset}$ has not changed during the measurement period.

WD 22 Rx-Tx Measurement Period

Assume $N_{PRS,req}$ comb pattern realizations are required for a WD 22 Rx-Tx time difference measurement, where $N_{PRS,req}$ can depend on FR1/FR2, bandwidth, Es/Iot, etc.

Proposal 10: When no measurement gaps are used, the WD 22 Rx-Tx measurement period can be defined as:

$$T = \text{ceil}(N_{PRS,req}/K_{PRS}) \times \max(T_{PRS}, T_{SRS}) + \Delta T,$$

where $K_{PRS} = L_{Prs}/\text{CombSizeN} \times \text{ResourceRepetitionFactor}$ is the number of comb pattern realizations within a single $T_{PRS}$, $L_{PRS}$ is the number of PRS symbols pe slot, ΔT is the extension due to dropped signals (see "The impact of dropped signals" section), $N_{PRS,req}$ comb pattern realizations are required for a WD 22 Rx-Tx time difference measurement.

Proposal 11: When measurement gaps are used, $K'_{PRS}$ ($K'_{PRS} \leq K_{PRS}$) is the number of comb realizations within the effective measurement time of a measurement gap, and the measurement period becomes:

$$T = \text{ceil}(N_{PRS,req}/K'_{PRS}) \times \max(T_{PRS}, T_{SRS}, \text{MGRP}) \times \text{CSSF} + \Delta T.$$

WD 22 Rx-Tx Time Difference Measurement Under Cell Change

The following agreements have been made:

If the cell change occurs on the serving cell where the SRS is configured then after the serving cell change: the WD 22 may restart the WD 22 Rx-Tx time difference measurement;

otherwise the WD 22 may continue the ongoing WD 22 Rx-Tx time difference measurement.

However, it has not been discussed yet which requirements may apply upon the serving cell change, when WD 22 continues the on-going WD 22 Rx-Tx time difference measurement. Different types of serving cell changes need to be considered.

Proposal 12: When the on-going WD 22 Rx-Tx measurement continues under a serving cell change (according to the earlier agreement), the WD 22 Rx-Tx time difference measurement period is extended, and the extension depends on the number of serving cell changes and on the corresponding interruption time.

Proposal 13: Applicable accuracy requirements for WD 22 Rx-Tx measurements under cell change:

For intra-frequency serving cell change, intra-frequency accuracy applies;

For inter-frequency serving cell change,
When the measured inter-frequency becomes a serving carrier frequency: inter-frequency accuracy applies,
When the measured inter-frequency remains inter-frequency: inter-frequency accuracy applies,
When the measured intra-frequency becomes inter-frequency: inter-frequency accuracy applies.

Intra-/Inter-Frequency WD 22 Rx-Tx Measurement Definitions and the Need for Gaps Proposal 14: Intra- and inter-frequency WD 22 Rx-Tx measurements are defined according to the table below.

TABLE 1

Intra-/inter-frequency WD 22 Rx-Tx measurements and the need for gaps

| | Definition | Need for measurement gaps | |
|---|---|---|---|
| Intra-frequency | The center frequency of PRS BW is the center frequency of a serving cell SSB The SCS PRS is the same as that of a serving cell SSB | not needed | Measured PRS bandwidth is fully within the active BWP of the WD 22 |
| | | needed | Measured PRS bandwidth is not fully within the active BWP of the WD 22 |

TABLE 1-continued

Intra-/inter-frequency WD 22 Rx-Tx measurements and the need for gaps

| | Definition | Need for measurement gaps | |
|---|---|---|---|
| Inter-frequency | if at least one of the two conditions above is not met | not needed | Measured PRS bandwidth is fully within the active BWP of the WD 22 |
| | | needed | Measured PRS bandwidth is not fully within the active BWP of the WD 22 |

Proposal 15: The need for measurement gaps is determined by whether the measured PRS bandwidth is fully within the active BWP of the WD 22 or not.

Proposal 16: Measurement gaps applicability for WD 22 Rx-Tx:

At least all 3GPP Rel-15 measurement gap configurations for NR are also applicable for WD 22 Rx-Tx measurements (this has been already agreed for NR E-CID measurements)

FFS: Additionally, new measurement gap patterns may need to be specified

Measurement gaps applicability is clarified for WD 22 Rx-Tx measurements New WD 22 measurement gaps for positioning purpose are beyond the scope of this disclosure.

Measurement and Reporting Capability for WD 22 Rx-Tx Measurements

In RAN1 #99, the following agreements were made:

WD 22 can be configured for DL PRS processing according to the following table:

| Description | Maximum numbers for DL PRS resources | Values that can be signaled as part of UE Capability |
|---|---|---|
| Max number of frequency layers (X1) | X1 = 4 | Values = {1, 4} FFS: other values |
| Max number of TRPs per frequency layer (X2) | X2 = 64 | |
| Max number of PRS resource sets per TRP (X3) per frequency layer | X3 = 2 | Values = {1, 2} |
| Max number of Resources per PRS resource set (X4) | X4 = 64 | FFS: values |
| Max number of DL PRS Resources per UE (X5) | NA | FFS: values |
| Max number of TRPs for all frequency layers (X6) per WD 22 | 256 | FFS: values |
| Max number of Resources per frequency layer (X7) | NA | FFS: values |

Note: This does not constrain in any way how features and feature sets are defined. The values in the table above may or may not be signalled to be different for different features or feature sets. For NR positioning, the following is therefore proposed:

Proposal 17: Ecat=1 for intra-frequency WD 22 Rx-Tx measurements, 1 report capable of WD 22 Rx-Tx measurements and also PRS-RSRP measurements (when configured for multi-RTT) on at least X2 TRPs, X3 PRS resource sets per TRP, and X4 PRS resources per PRS resource set, per intra-frequency layer.

Proposal 18: Ecat=1 for inter-frequency WD 22 Rx-Tx measurements, 1 report capable of UE Rx-Tx measurements and also PRS-RSRP measurements (when configured for multi-RTT) on at least X2 TRPs, X3 PRS resource sets per TRP, and X4 PRS resources per PRS resource set, per inter-frequency layer.

WD 22 Rx-Tx Measurement Requirements Under TA Adjustment

The following agreements related to TA have been made:

Impact of PRS based measurements on WD 22 timing:
Existing requirements on WD 22 transmit timing in section 7.1 and TA in section 7.3 in 3GPP TS 38.133 may apply during the PRS based positioning measurements.

However, with the above agreement, it is unclear what is the WD 22 behavior and what are the WD 22 requirements for the WD 22 Rx-Tx measurement during which timing adjustment was applied at least once.

TA adjustment, configured or autonomous, can occur multiple times during the same WD 22 Rx-Tx measurement time period, therefore dropping the WD 22 Rx-Tx measurement every time the TA occurs would be unfortunate and this resulted in a lot resources just wasted, both at the WD 22 side and at the network side. Therefore, the WD 22 may continue the measurement, but it can compensate the measurement by the amount of the timing adjustment applied at the WD 22 during the WD 22 Rx-Tx measurement period.

Proposal 19: The WD 22 may continue the WD 22 Rx-Tx time difference measurement during which timing adjustment for its UL transmissions, autonomous adjustment or based on configured TA, occurred one or more times.

Proposal 20: The WD 22 may meet the same accuracy requirements, regardless of whether timing adjustment occurred or not.

Proposal 21: The WD 22 can compensate the measurement by the amount of the timing adjustment applied at the WD 22 during the WD 22 Rx-Tx measurement period.

Summary

Side Conditions:

Proposal 1: Serving cell side condition for WD 22 Rx-Tx: −3 dB, for FR1 and FR2. Measurement and accuracy requirements:

Observation 1: SRS and PRS are configured by different network nodes 16 and/or positioning node 15 (serving cell and LMF, respectively).

Observation 2: SRS and PRS may be on different frequencies (inter-frequency WD 22 Rx-TX).

Observation 3: WD 22 Rx-Tx measurement period depends on the periodicity of SRS signals.

Observation 4: WD 22 Rx-Tx measurement period depends on the periodicity of PRS signals.

Proposal 2: WD 22 Rx-Tx measurement period depends on max(PRS periodicity, SRS periodicity).

Proposal 3: The requirements for WD 22 Rx-Tx apply regardless of the time separation between SRS and PRS.

Proposal 4: If the closest subframes #i and #j are separated by more than ½ subframe, the WD 22 may compensate for the difference in the received timing of radio frame #i used for $T_{UE-TX}$ estimation and the subframe #j.

Proposal 5: WD 22 Rx-Tx measurement period is extended by ΔT, to compensate for the number of PRS occasions dropped due to their overlap with SSB symbols.

The maximum for the allowed extension ΔT shall be limited.

Proposal 6: WD 22 Rx-Tx measurement period is extended due to dropped SRS.

Proposal 7: When the measurement period is extended, the increase in the measurement period depends at least on the periodicity of the PRS/SRS resource which has non-available occasions and the number of such non-available PRS/SRS occasions, but may further depend on the measurement gap configuration, DRX, etc.

The extension is proportional to $\max(T_{PRS}, T_{SRS})*X$, where $T_{PRS}$ and $T_{SRS}$ are the PRS periodicity and SRS periodicity, respectively, and X is the number of time intervals of length $\max(T_{PRS}, T_{SRS})$ where at least one of PRS and SRS is dropped.

Proposal 8: If the number of PRS/SRS occasions not available at the WD 22 exceeds an acceptable limit, the measurement can be dropped, i.e., no further extension of the measurement period is allowed.

Proposal 9: The requirements for WD 22 Rx-Tx tine difference measurement apply, provided the $N_{TA\ offset}$ has not changed during the measurement period.

Proposal 10: When no measurement gaps are used, the WD 22 Rx-Tx measurement period can be defined as:

$$T = \mathrm{ceil}(N_{PRS,req}/K_{PRS}) \times \max(T_{PRS}, T_{SRS}) + \Delta T,$$

where $K_{PRS} = L_{PRS}/\mathrm{CombSizeN} \times \mathrm{ResourceRepetitionFactor}$ is the number of comb pattern realizations within a single $T_{PRS}$, $L_{PRS}$ is the number of PRS symbols pe slot, ΔT is the extension due to dropped signals, $N_{PRS,req}$ comb pattern realizations are required for a WD 22 Rx-Tx time difference measurement.

Proposal 11: When measurement gaps are used, $K'_{PRS}$ ($K'_{PRS} \leq K_{PRS}$) is the number of comb realizations within the effective measurement time of a measurement gap, and the measurement period becomes:

$$T = \mathrm{ceil}(N_{PRS,req}/K'_{PRS}) \times \max(T_{PRS}, T_{SRS}, \mathrm{MGRP}) \times \mathrm{CSSF} + \Delta T.$$

Proposal 12: When the on-going WD 22 Rx-Tx measurement continues under a serving cell change (according to the earlier agreement), the WD 22 Rx-Tx time difference measurement period is extended, and the extension depends on the number of serving cell changes and on the corresponding interruption time.

Proposal 13: Applicable accuracy requirements for WD 22 Rx-Tx measurements under cell change:

For intra-frequency serving cell change, intra-frequency accuracy applies;

For inter-frequency serving cell change,

When the measured inter-frequency becomes a serving carrier frequency: inter-frequency accuracy applies, When the measured inter-frequency remains inter-frequency: inter-frequency accuracy applies, When the measured intra-frequency becomes inter-frequency: inter-frequency accuracy applies.

Intra-/Inter-Frequency:

Proposal 14: Intra- and inter-frequency WD 22 Rx-Tx measurements are defined according to the table below.

TABLE 1

Intra-/inter-frequency WD 22 Rx-Tx measurements and the need for gaps

| | Definition | Need for measurement gaps | |
|---|---|---|---|
| Intra-frequency | The center frequency of PRS BW is the center frequency of a serving cell SSB The SCS PRS is the same as that of a serving cell SSB | not needed | Measured PRS bandwidth is fully within the active BWP of the UE |
| | | needed | Measured PRS bandwidth is not fully within the active BWP of the UE |
| Inter-frequency | if at least one of the two conditions above is not met | not needed | Measured PRS bandwidth is fully within the active BWP of the UE |
| | | needed | Measured PRS bandwidth is not fully within the active BWP of the UE |

Proposal 15: The need for measurement gaps is determined by whether the measured PRS bandwidth is fully within the active BWP of the WD 22 or not.

Proposal 16: Measurement gaps applicability for WD 22 Rx-Tx:
  At least all Rel-15 measurement gap configurations for NR are also applicable for WD 22 Rx-Tx measurements (this has been already agreed for NR E-CID measurements)
  FFS: Additionally, new measurement gap patterns may need to be specified
  Measurement gaps applicability is clarified for WD 22 Rx-Tx measurements Reporting Criteria/Capabilities:
  Proposal 17: Ecat=1 for intra-frequency WD 22 Rx-Tx measurements, 1 report capable of WD 22 Rx-Tx measurements and also PRS-RSRP measurements (when configured for multi-RTT) on at least X2 TRPs, X3 PRS resource sets per TRP, and X4 PRS resources per PRS resource set, per intra-frequency layer.
  Proposal 18: Ecat=1 for inter-frequency WD 22 Rx-Tx measurements, 1 report capable of WD 22 Rx-Tx measurements and also PRS-RSRP measurements (when configured for multi-RTT) on at least X2 TRPs, X3 PRS resource sets per TRP, and X4 PRS resources per PRS resource set, per inter-frequency layer.

WD 22 Rx-Tx during TA change:
  Proposal 19: The WD 22 continues the WD 22 Rx-Tx time difference measurement during which timing adjustment for its UL transmissions, autonomous adjustment or based on configured TA, occurred one or more times.
  Proposal 20: The WD 22 meets the same accuracy requirements, regardless of whether timing adjustment occurred or not.
  Proposal 21: The WD 22 can compensate the measurement by the amount of the timing adjustment applied at the WD 22 during the WD 22 Rx-Tx measurement period.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that May be Used in the Preceding Description Include:
FDD Frequency division duplex
FTO Fixed time offset
LMU Location measurement unit
NN Network node
O&M Operational and management
PRS Positioning reference signal
RTT Round trip time
SON Self-organizing network
SRS Sounding reference signal
TDD Time division duplex
TRP Transmission and/or Reception Point It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A first node configured to communicate with a second node, the first node comprising processing circuitry configured to:
perform at least a first timing measurement over a first measurement period on signals communicated between the first node and second node;
determine that a fixed time offset, FTO, has changed during the first timing measurement period;
perform at least one operational task based on the determination that the FTO has changed, the at least one operational task includes providing information to a third node about the change in the FTO, the information being indicative of one or both of a type of change and an amount of change of the FTO; and
send an error indication for the first timing measurement due to the determined change in the FTO.

2. The first node of claim 1, wherein the FTO is determined to have changed from a previously configured FTO that is set before the first measurement period.

3. The first node of claim 1, wherein the at least one operational task includes discarding the first timing measurement.

4. The first node of claim 1, wherein the at least one operational task includes
informing the third node about the at least one operational task.

5. The first node of claim 4, wherein the processing circuitry is further configured to, after performing the at least one operational task, receive an indication of a modified FTO to implement.

6. The first node of claim 1, wherein the first node is a wireless device and the second node is a base station.

7. The first node of claim 1, wherein the first node is a wireless device and the second node is a wireless device.

8. The first node of claim 1, wherein the processing circuitry is further configured to:
perform at least a second timing measurement over a second measurement period on signals communicated between the first and second node;
determine that the FTO has not changed based on at least the second timing measurement; and
continue performing at least the second timing measurement over the second measurement period.

9. The first node of claim 1, wherein the first node is configured to communicate with the second node according to New Radio, NR, Radio Access Technology, RAT, and the FTO corresponds to parameter $N_{TA\ offset}$.

10. A method implemented by first node configured to communicate with a second node, the method comprising:
performing at least a first timing measurement over a first measurement period on signals communicated between the first node and second node;
determining that a fixed time offset, FTO, has changed during the first timing measurement period;
performing at least one operational task based on the determination that the FTO has changed, the at least one operational task includes providing information to a third node about the change in the FTO, the information being indicative of one or both of a type of change and an amount of change of the FTO; and
sending an error indication for the first timing measurement due to the determined change in the FTO.

11. The method of claim 10, wherein the FTO is determined to have changed from a previously configured FTO that is set before the first measurement period.

12. The method of claim 10, wherein the at least one operational task includes discarding the first timing measurement.

13. The method of claim 10, wherein the at least one operational task includes
informing the third node about the at least one operational task.

14. The method of claim 13, further comprising, after performing the at least one operational task, receiving an indication of a modified FTO to implement.

15. The method of claim 10, wherein the first node is a wireless device and the second node is a base station.

16. The method of claim 10, wherein the first node is a wireless device and the second node is a wireless device.

17. The method of claim 10, further comprising:
performing at least a second timing measurement over a second measurement period on signals communicated between the first and second node;
determining that the FTO has not changed based on at least the second timing measurement; and
continuing performing at least the second timing measurement over the second measurement period.

18. The method of claim 10, wherein the first node is configured to communicate with the second node according to New Radio, NR, Radio Access Technology, RAT, and the FTO corresponds to parameter $N_{TA\ offset}$.

19. A non-transitory computer readable medium including instructions which, when executed by a processor of a first node, cause the first node to:
- perform at least a first timing measurement over a first measurement period on signals communicated between a first node and a second node;
- determine that a fixed time offset, FTO, has changed during the first measurement period;
- perform at least one operational task based on the determination that the FTO has changed, the at least one operational task including providing information to a third node about the change in the FTO, the information being indicative of at least one of a type of change and an amount of change of the FTO; and
- sending an error message or error indication, the error message or error indication for the first timing measurement due to the determined change in the FTO.

* * * * *